United States Patent [19]

Beckwith et al.

[11] 4,218,625
[45] Aug. 19, 1980

[54] SYNCHRONIZING CHECK RELAY

[76] Inventors: Robert W. Beckwith, 5728 Oakhurst Dr., Seminole, Fla. 33542; Michael A. Wyatt, 4336 Millbrook Ave., Tampa, Fla. 33611

[21] Appl. No.: 872,268

[22] Filed: Jan. 25, 1978

[51] Int. Cl.² ............................................. H02J 3/08
[52] U.S. Cl. .................................................. 307/87
[58] Field of Search ...................................... 307/87

[56] References Cited

U.S. PATENT DOCUMENTS

| | | | |
|---|---|---|---|
| 3,312,864 | 4/1967 | Schwanenflugel | 307/87 |
| 3,748,489 | 7/1973 | South | 307/87 |
| 3,794,846 | 2/1974 | Schlicher | 307/87 |
| 4,096,395 | 6/1978 | Bogel | 307/87 |
| 4,121,111 | 10/1978 | Crisafulli | 307/87 |

*Primary Examiner*—L. T. Hix
*Assistant Examiner*—S. D. Schneyer

[57] ABSTRACT

A synchronizing check relay is used in an electrical transmission network for controlling a circuit breaker to interconnect first and second transmission lines to establish power flow therebetween and includes an input circuit for receiving signals from first and second transmission lines. A phase difference generator generates a phase difference signal proportional to a phase difference between said signals from said first and second transmission lines. A phase difference comparator receives the phase difference signal and produces a phase output signal at a selected phase condition. An adjustable timer produces a timer signal after a selected time interval in response to the phase comparator to insure a proper phase difference between the transmission lines. The voltage sensor produces a breaker closing inhibit signal when one of the alternating current voltages is outside a reference limit. A control circuit is responsive to the phase output signal, the time signal and the breaker closing inhibit signal for providing a control response to the circuit breaker.

36 Claims, 12 Drawing Figures

SYNCHRONIZING CHECK RELAY

BACKGROUND OF THE INVENTION

Often during electrical storms or other types of electrical interference, including line faults, circuit breakers connecting sections of transmission lines open. After the circuit breakers open, in order to restore power it is necessary to close the circuit breakers. Since alternating current is present on both sides of the open circuit breaker, it is essential that the circuit breaker only be closed when the potential difference is at a minimum or a zero point across the circuit breaker. The potential difference is equal to the potential difference between respective R.M.S. voltages, plus a reactive potential difference caused by a difference of phase of the voltages at the closing time.

A number of devices are presently on the market, which are used for checking the phase-synchronization between a pair of alternating currents to allow circuit breaker closing to occur without immediately reopening the circuit breaker or causing the disturbances to the power network. The prior art devices, however, could be better. For instance, a fault is the fact that the mechanical devices do not allow uniform and consistent breaker closing over a range of temperatures and voltages. The mechanical devices are inaccurate at relatively high or low temperatures. The inaccuracy of the mechanical devices, therefore, may cause an excess power flow when breaker closing is attempted. Alternatively the inaccuracy may block closing when conditions actually are within limits.

The phase angle and closing time function are not independent in the prior art devices as is shown in U.S. Pat. No. 3,491,248 to Beckwith, et. al. and U.S. Pat. No. 3,562,545 to Rubner, et. al. Thus, breaker closing is effected when it is not wanted. Many prior art synchronizing check relays do not have any provision for measuring the R.M.S. voltage difference across the breaker. Thus, the prior art devices may attempt to close a breaker across which there is phase synchronization, but a large R.M.S. potential difference.

What is needed, then, is an accurate temperature independent solid state synchronizing check relay. The synchronizing check relay should provide a linear, or flat breaker closing response over a wide range of temperatures and voltages. The phase angle response and time response are mutually independent of temperature and voltage.

SUMMARY OF THE INVENTION

A synchronizing check relay is disclosed herein. The synchronizing check relay includes a pair of input circuits. A pair of alternating current to direct current converters is connected to the input circuit. Each of the A.C.-to-D.C. converters is, in turn, connected to a lower voltage comparator. An upper voltage comparator is connected to receive the direct current potential from each of the A.C.-to-D.C. converters. The upper voltage comparator is connected to a voltage output logic section, which is, in turn, connected to a power relay logic and a power relay circuit. The power relay circuit is connected to a circuit breaker which is to be controlled.

Both of the A.C.-to-D.C. converters are connected to an absolute value difference amplifier. A voltage difference comparator is connected to the absolute value difference amplifier. The voltage difference comparator is connected to the voltage output logic.

A dead bus comparator is connected to one of the A.C.-to-D.C. converters. A dead line comparator is connected to the other A.C.-to-D.C. converter. Both the dead line comparator and the dead bus comparator are connected to a dead line-dead bus logic system, which allows selection of either the dead bus or dead line comparator, or both, to be connected to the voltage output logic.

A gate is connected to the first input circuit, and to the second input circuit. An active filter is connected to the gate. A scaling amplifier is connected to the active filter. A phase angle comparator is connected to the scaling amplifier. A timer is connected to the phase angle comparator. The timer is connected to the power relay logic and power relay control circuit.

The synchronizing check relay is used with an electrical transmission system having a first plurality of transmission lines and a second plurality of transmission lines. Both pluralities of transmission lines are connected to a circuit breaker. A first external potential transformer is connected to the first plurality of transmission lines. A second external potential transformer is connected to the second plurality of transmission lines. The input circuits are adapted to be connected to the external potential transformers. The power relay control circuit is adapted to be connected to the circuit breaker.

In use, the input circuits receive respective stepped down voltages from the external transformers. The potentials are supplied to the A.C.-to-D.C. converters. Each of the A.C.-to-D.C. converters produces an output direct current potential proportional to the A.C. voltage which it detects. The lower voltage comparator produces a lower voltage breaker closing inhibit signal when either of the D.C. voltages is less than a preselected minimum. The upper voltage comparator produces an upper voltage breaker closing inhibit signal when either of the D.C. voltages exceeds a preselected maximum.

The absolute value difference amplifier receives the D.C. potentials and generates an absolute value potential proportional to a difference between the value of the first D.C. potential and the value of the second D.C. potential. The voltage difference comparator produces a voltage difference breaker closing inhibit signal when the absolute value potential exceeds a preselected maximum.

The dead bus comparator receives the first D.C. potential and generates a dead bus breaker closing override signal when the first D.C. signal potential is less than a first preselected minimum. The dead line comparator receives the second D.C. potential and produces a dead line breaker closing override signal when the second D.C. potential is less than a second preselected minimum. The dead line-dead bus logic provides either the dead bus breaker closing override signal or the dead line breaker closing override signal to the power relay circuit but not both simultaneously.

The voltage output logic generates a master breaker closing inhibit signal when it receives any other breaker closing inhibit signal. The master breaker closing inhibit signal is supplied to the power relay circuit. The gate produces a rectangular wave output having a time duration equal to a time duration of high potential coincidence between the voltages received at the gate. The active filter receives the rectangular wave and produces a filter voltage proportional to the time duration of the rectangular wave. The instantaneous amplitude of the filter voltage is proportional to the phase difference between the first and second A.C. voltages. The phase angle comparator receives the voltage and produces a selected phase angle output signal when the amplitude of the filter voltage is less than an adjustable preselected minimum. The timer is switched on when it receives the selected phase angle output signal. The timer is switched off in the absence of the selected phase angle output signal. The timer produces a time signal a selected time interval after it is switched on. The power relay circuit is closed when it receives the time signal and the selected phase angle comparator output in the absence of the master breaker closing inhibit signal. Closure of the power relay circuit effects closure of the circuit breaker to which it is connected. Closure of the power relay circuit is also effected by the dead bus or dead line breaker closure override signal independent of other portions of the circuit.

It is a principal object of the present invention to provide a synchronizing check relay, which provides independent phase angle and closing time functions.

It is another object of the present invention to provide a solid state synchronizing check relay, which provides a linear response over a wide range of temperatures.

It is another object of the present invention to provide a synchronizing check relay which senses and responds to R.M.S. voltage irregularities of line potentials.

Other objects and uses of the present invention will become obvious to one skilled in the art upon a perusal of the following specification and claims in light of the accompanying drawings.

DESCRIPTION OF THE PREFERRED EMBODIMENT

Figure 1:
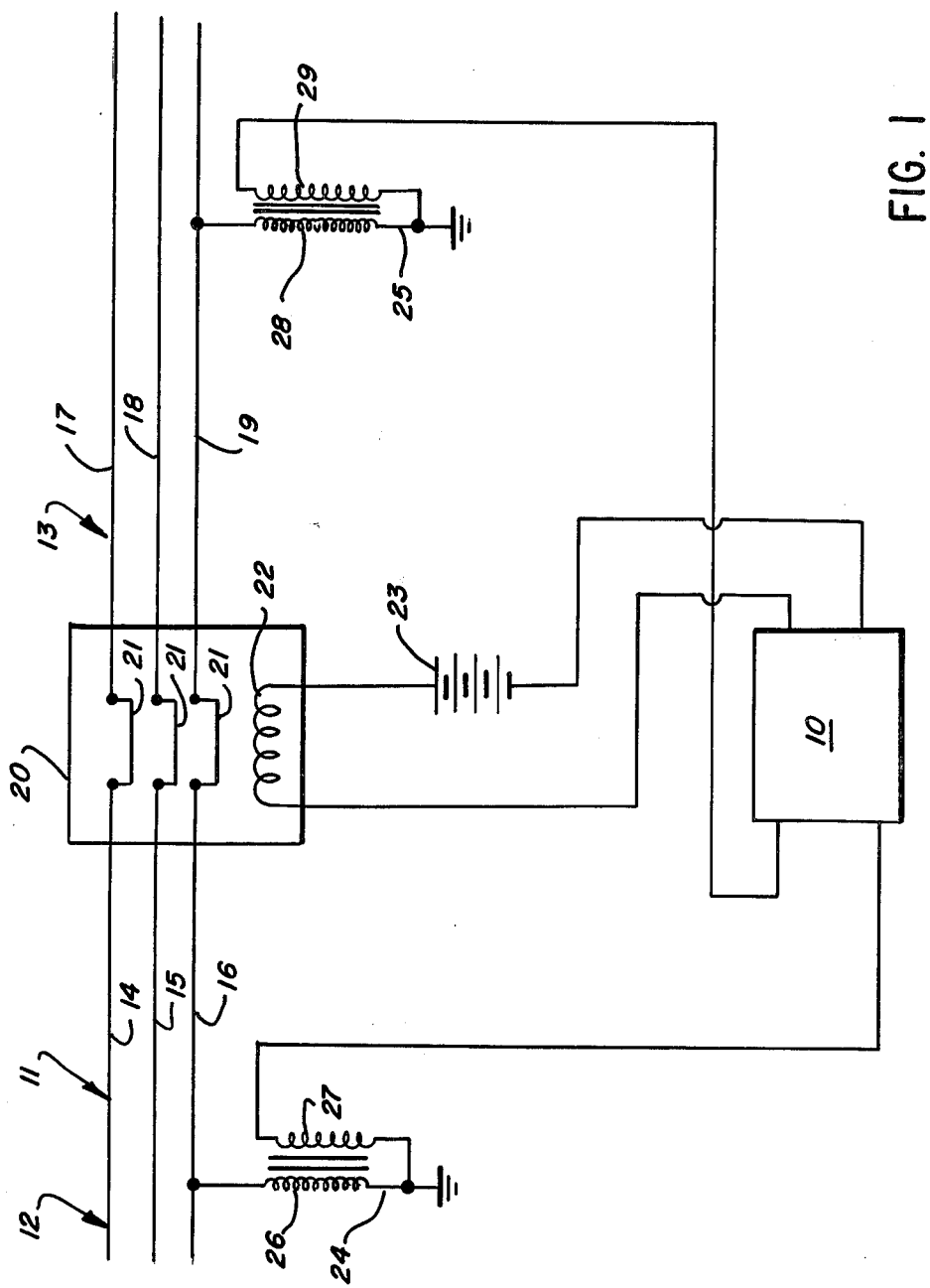
FIG. 1 is a schematic diagram of an electrical transmission having a synchronizing check relay embodying the present invention connected thereto.

A synchronizing check relay, generally indicated by numeral 10, and embodying the present invention is herein disclosed. Synchronizing check relay 10 is connected to a portion of an electrical transmission system 11. Electrical transmission system 11 has a plurality of bus three phase leads 12; and has a plurality of line three phase leads 13. Bus three phase leads 12 include a first bus lead 14, a second bus lead 15 and a third bus lead 16. Line three phase leads 13 include a first line lead 17, a second line lead 18 and a third line lead 19. A circuit breaker 20 is connected between plurality of bus leads 12 and plurality of line leads 13. Circuit breaker 20 has a plurality of movable contacts 21. Each movable contact 21 selectively connects its respective bus lead to its respective line lead. Circuit breaker 20 also has a coil 22. A station battery 23 is connected to coil 22.

A bus external potential transformer 24 is connected to lead 16 of plurality of bus leads 12. A line external potential transformer 25 is connected to lead 19 of plurality of line leads 13. Bus potential transformer 24 has a primary winding 26 and a secondary winding 27. Primary winding 26 is connected between bus lead 16 and ground. Secondary winding 27 is connected to primary winding 26 adjacent the ground; and is also connected to synchronizing check relay 10. Line potential transformer 25 has a primary winding 28 and a secondary winding 29. Primary winding 28 is connected between line lead 19 and ground. Secondary winding 29 is connected to primary winding 28 adjacent the ground; and is also connected to synchronizing check relay 10. Coil 22 and station battery 23 are connected to synchronizing check relay 10. Although potential transformers are employed in the electrical transmission system other voltage reduction devices may also be employed by men skilled in the art.

Synchronizing check relay 10 includes input means 31. Input means 31 is connected to secondary winding 27 of bus potential transformer 25 and secondary winding 29 of line potential transformer 25. A voltage sensor 32 is connected to input means 31. A phase sensor 33 is also connected to input means 31. Phase sensor 33 includes a phase difference signal generating means 34 and a phase angle comparator 35. A timer 36 is connected to phase angle comparator 35. An output control system 37 is connected to voltage sensor 32, phase sensor 33 and timer 36. Output control system 37 is connected to station battery 23 and coil 22.

Input means 31 includes a pair of input circuits, respectively numbered 38 and 39. Input circuit 38 is connected to secondary winding 27 of bus potential transformer 24. Input circuit 39 is connected to line potential transformer 25 and at secondary winding 29. A power supply 40 is connected to input circuits 38 and 39.

Voltage sensor 32 includes a first alternating current to direct current converter 41, connected to input circuit 38. A second alternating current to direct current converter 42 is connected to input circuit 39. A lower voltage comparator 43 is connected to both alternating current to direct current converters 41 and 42. An upper voltage comparator 44 is connected to both alternating current to direct current converters 41 and 42. An absolute value difference sensor 45 is connected to both alternating current to direct current converters 41 and 42. Absolute value sensor 45 includes an absolute value difference amplifier 46. A voltage difference comparator 47 is connected to absolute value difference amplifier 46.

A dead bus comparator 48 is connected to alternating current to direct current converter 41. A dead line comparator 49 is connected to alternating current to direct current converter 42. A dead bus-dead line logic system 50 is connected to dead bus comparator 48 and dead line comparator 49.

Phase difference signal generating means 34 includes a zero crossing gate 51, connected to input circuits 38 and 39. An integrating active filter 52 is connected to zero crossing detector 51. A scaling amplifier 53 is connected to active filter 52. Phase angle comparator 35 is connected to scaling amplifier 53.

Output control system 37 includes a voltage output logic circuit 54 connected to voltage sensor 32. Voltage output logic circuit 54 is connected to lower voltage comparator 43, upper voltage comparator 44 and voltage difference comparator 47. A power relay logic circuit 55 is connected to voltage output logic circuit 54, timer 36 and dead bus-dead line logic section 50. Power relay control circuit 56 is adapted for connection to station battery 23 and coil 22 of circuit breaker 20.

Input circuit 38 includes a pair of input terminals 57 and 58, adapted for connection to potential transformer 24. A fuse 59 is connected to terminal 57. A capacitor 60 is connected across a pair of leads, respectively numbered 61 and 62, which are connected, respectively, to fuse 59 and terminal 57. A lead 64 is connected to fuse 59. A capacitor 65 is connected from lead 62 to ground. A varistor 66 is connected across lines 64 and 62, in parallel with capacitor 58. A varistor 68 is connected from lead 62 to ground. Leads 64 and 62 are connected to a potential transformer 70 at a primary winding 72. Transformer 70 also has a secondary winding 74, having a pair of output leads, respectively numbered 76 (to which a lead 77 is connected) and 78, and a center tap 80. Center tap 80 is grounded.

Secondary leads 76 and 78 are connected to a full wave rectifier bridge 82. Full wave rectifier bridge 82 is a conventional full wave rectifier bridge, having a first diode 84, a second diode 86, a third diode 88 and a fourth diode 90. Full wave rectifier bridge 82 is connected to a diode 91. Diode 91 is connected to a resistor 92. Resistor 92 is connected to a capacitor 94. Capacitor 94 is grounded.

Input circuit 39 includes a pair of terminals, respectively numbered 96 and 98, adapted for connection to the second external potential transformer 25. Input terminals 96 are each connected to respective leads numbered 100 and 102. Line 100 has a fuse 104 connected in series with it. A line 105 is connected to fuse 104. A capacitor 106 is connected across lines 105 and 102. A capacitor 108 is connected from line 102 to ground. A varistor 110 is connected across leads 105 and 102. A varistor 112 is connected from lead 102 to ground. A transformer 114 is connected to leads 105 and 102 at a primary winding 116. Transformer 114 also has a secondary winding 118, having a pair of output leads 120 (to which is connected a lead 121) and 122, and a center tap 124. Center tap 124 is grounded. The polarity of primary winding 116 is reversed with respect to the polarity of secondary winding 118.

Output leads 120 and 122 are connected to a full wave rectifier bridge 126. Full wave rectifier bridge 126 includes a first diode 128, a second diode 130, a third diode 132, and a fourth diode 134. Full wave rectifier bridge 126 is connected by a lead 136 to full wave rectifier bridge 82. A lead 137 is connected to lead 136. Full wave rectifier bridge 126 is also connected in series to a resistor 138 and a capacitor 140. Capacitor 140 is grounded.

Immediately adjacent capacitor 94 is a tap 141, from which a positive 24-volt potential may be obtained. A lead 142 is connected to tap 141. Immediately adjacent capacitor 140 is connected a lead 144 and a tap 145, from which a negative 24-volt potential may be obtained. A Zener diode 147 is connected to lead 142 and to ground. A Zener diode 148 is connected in between lead 144 and ground. An integrated circuit power supply regulator 150, having a pin 152 corresponding to pin 1; a pin 154 corresponding to pin 6; a pin 156 corresponding to pin 5; a pin 158 corresponding to pin 7; a pin 160 corresponding to pin 3; a pin 162 corresponding to the case; a pin 164 corresponding to pin 9; a pin 166 corresponding to pin 4; and a pin 168 corresponding to pin 2; is connected to lead 145 at pin 156. A lead 170 is also connected to pin 156. A capacitor 172 connected between lead 170 and ground. An LH0070-1H precision buffered reference 174, having a plurality of leads 176, 178 and 180, is connected at lead 176 to lead 170 and capacitor 172. Lead 178 is connected at lead 176 to lead 170 and capacitor 172. Lead 178 is connected to ground. Lead 180 is connected to lead 182. A capacitor 184 is connected between lead 182 and ground. An external tap 185 is connected to lead 182.

Pin 158 of integrated circuit 150 is connected to a capacitor 186, which is in turn connected to ground. Pin 160 of integrated circuit 150 is connected to a resistor 188, which is connected to lead 144. Pin 162 is connected directly to lead 144. Pin 164 is connected to a capacitor 190, which is also connected to lead 144. Pin 166 is connected to ground. Pin 168 is connected to a resistor 192, which is in turn connected to ground. Pin 152 is connected to a lead 194. An external tap 195 is connected to lead 194. Lead 194 is connected to a tantalum capacitor 196, which is in turn connected to ground. An external tap 197 is connected to capacitor 196. Pin 154 is connected to a lead 198. Lead 198 is connected to a tantalum capacitor 200, which is connected to ground. An external tap 201 is connected to lead 198. Integrated circuit 150 may be selected from a variety of integrated circuit power supply regulators. However, in this embodiment, a Raytheon RC 4194 TK integrated circuit dual tracking voltage regulator is employed.

Alternating current to direct current converter 31 is connected to leads 64 and 62 of input circuit 18. A first input lead 202 is connected to lead 64. A second input lead 204 is connected to lead 62. Leads 202 and 204 are connected to a transformer 206 at a primary winding 208. Transformer 206 also has a secondary winding 210. One side of secondary winding 210 is connected by a ground lead 212 to ground. An opposite side of secondary winding 210 is connected to a lead 214. A resistor 216 is connected to lead 214 at one side. A lead 218 is connected to another side of resistor 216. Lead 218 is connected to a quad operational amplifier 219 at an operational amplifier 220 at an inverting terminal 222. Operational amplifier 220 also has a non-inverting terminal 224 and an output terminal 226. A first diode 228 and a second diode 230 are connected to inverting terminal 222 of operational amplifier 220. Diodes 228 and 230 are also grounded. A diode 231 is connected to output terminal 226. A diode 232 is connected between output terminal 226 and input inverting terminal 222 of operational amplifier 220. A resistor 233 is connected between non-inverting terminal 224 of operational amplifier 220 and ground. A resistor 234 is connected to resistor 216 and lead 218. Resistor 234 is connected to diode 231. A resistor 238 is connected to lead 214 adjacent to resistor 216. The other end of resistor 238 connects to lead 241. A diode 240 is connected to lead 241 and to ground. A diode 242 is connected in parallel with dioxide 240 between lead 241 and ground. A lead 244 is connected from lead 241 to a resistor 246. Resistor 246 is connected to the junction of resistor 234 and diode 231. A lead 248 is connected to the junction of lead 244 and resistor 246.

Lead 248 is connected to an inverting terminal 250 of an operational amplifier 252 included in quad operational amplifier 219. Operational amplifier 252 has a non-inverting terminal 254 and an output terminal 256. A pair of power terminals, respectively numbered 258 and 260, is also connected to quad operational amplifier 219. Non-inverting terminal 254 is connected to a resistor 261. Resistor 261 is, in turn, connected to ground. Power terminal 258 is connected to lead 198 of power supply 20. Power terminal 260 is connected to lead 194 of power supply 20. Power terminals 258 and 260 are connected together by a capacitor 262. A feedback resistor 264 is connected to inverting terminal 250. Resistor 264 is connected to a potentiometer 266. Potentiometer 266 is connected to output terminal 256 of operational amplifier 252. Potentiometer 266 has a movable tap 268. Tap 268 is connected to an output lead 270 of alternating current to direct current converter 41. Output lead 270 is also connected to output terminal 256 of operational amplifier 252. A capacitor 271 is connected between lead 244 and output lead 270.

An external tap 271 is connected to lead 270. A pair of diodes, respectively numbered 272 and 274, is also connected to lead 270. Diode 272 is connected back-biased to lead 298. Diode 274 is connected back-biased to ground. A resistor 276 is connected to lead 270. A remote sensing port 278 is connected to resistor 276.

Similarly, alternating current to direct current converter 42 is substantially identical to alternating current to direct current converter 41. Alternating current to direct current converter 42 includes a pair of input terminals 302 and 304. Input terminals 302 and 304 are respectively connected to leads 105 and 102 of input circuit 39. Input terminals 302 and 304 are connected to a transformer 306. Transformer 306 has a primary winding 308 and a secondary winding 310. Secondary winding 310 is connected at a lead 312 to ground. A lead 314 is also connected to secondary winding 310. A resistor 316 is connected to lead 314. A lead 318 is connected to resistor 316. Lead 318 is connected to an operational amplifier 320 which is part of quad operational amplifier 219, at an input terminal 322. Operational amplifier 320 also has a non-inverting input terminal 324 and an output terminal 326. A diode 328 and a diode 330 are connected to inverting terminal 322 of operational amplifier 320. A diode 331 is connected between output terminal 326 and inverting terminal 322. A resistor 332 is connected to non-inverting terminal 324. Resistor 332 is also connected to ground. A resistor 334 is connected to lead 318. A diode 336 is connected between resistor 334 and output terminal 326. A resistor 338 is connected to lead 314. A lead 339 is connected to resistor 338. A diode 340 is connected between lead 339 and ground. A diode 342 is connected between lead 339 and ground. A lead 344 is connected to lead 339. A resistor 346 is connected between diode 336 and lead 344. A lead 348 is connected to the junction of resistor 346 and lead 344.

Lead 348 is connected to an inverting terminal 350 of an operational amplifier 352. Operational amplifier 352 is part of quad operational amplifier 219. Operational amplifier 352 has a non-inverting input terminal 354, and an output terminal 356. A resistor 358 is connected between non-inverting input terminal 354 and ground. A resistor 360 and a potentiometer 361 are series connected between lead 348 and terminal 356. Potentiometer 361 has a movable tap 362. A capacitor 363 is connected in parallel with resistor 360 and potentiometer 361. A lead 364 is connected to output terminal 356. Lead 364 is also connected to tap 362 and to capacitor 363. An external tap 365 is connected to lead 364. A diode 366 is connected back-biased between lead 364 and ground. A lead 367 is connected to lead 364. A diode 368 is connected back-biased between lead 367 and lead 198. A resistor 369 is connected to diode 368. A remote sensing port 370 is connected to resistor 369.

Lower voltage comparator 43 is connected to both alternating current to direct current converters 41 and 42. Lower voltage comparator 43 is connected to lead 270 at an inverting terminal 372 of an operational amplifier 374. Operational amplifier 374 is part of a quad operational amplifier 375. Operational amplifier 374 also has a non-inverting input terminal 376 and an output terminal 378. Quad operational amplifier 375 has a positive power terminal 380 and a negative power terminal 382. Positive potential power terminal 380 is connected to lead 198. Negative power terminal 382 is connected to lead 194. A capacitor 384 is connected across power terminals 380 and 382.

An operational amplifier 386, having an inverting terminal 388, is connected to lead 364 at inverting terminal 388. Operational amplifier 386 also has a non-inverting input terminal 390 and an output terminal 392. Operational amplifier 386 is part of quad operational amplifier 375. Non-inverting input terminal 390 is connected to lead 394, which is in turn connected to non-inverting terminal 376 of operational amplifier 374.

Lead 394 is connected to a movable tap 396 of a potentiometer 398. Potentiometer 398 is connected to a resistor 400. Resistor 400 is connected to ground. Potentiometer 398 is also connected to a resistor 402. Resistor 402 is connected to lead 182. A resistor 404 is connected to resistors 400 and 402, in parallel with potentiometer 398. A resistor 406 is connected to resistor 404. A resistor 408 is connected to resistors 404 and 406. Resistor 406 is, in turn, connected to output terminal 378 of operational amplifier 374. Resistor 408 is connected to output terminal 392 of operational amplifier 386. A resistor 410 is connected to output terminal 392 of operational amplifier 386. A light-emitting diode 412 is connected to resistor 410. Light-emitting diode 412 is also connected to lead 198. A diode 414 is connected to output terminal 392 of operational amplifier 386. A diode 416 is connected to output terminal 378 of operational amplifier 374. A resistor 417 is connected to output terminal 378. A light-emitting diode 418 is connected to resistor 417. Light-emitting diode 418 is also connected to lead 198.

Upper voltage comparator 44 is connected to both alternating current to direct current converters 41 and 42. Upper voltage comparator 44 includes an operational amplifier 420, connected to lead 270 at an input terminal 422. Operational amplifier 420 also has a non-inverting input terminal 424 and an output terminal 426. Operational amplifier 420 is part of quad operational amplifier 375. Non-inverting terminal 424 is connected to a lead 428. Lead 428 is connected to a movable tap 430 of a potentiometer 432. Lead 428 is connected to a non-inverting terminal 434 of an operational amplifier 436. Operational amplifier 436 also has an inverting terminal 438 and an output terminal 440. Operational amplifier 436 is part of quad operational amplifier 375. Inverting terminal 438 is connected to lead 367. Potentiometer 432 is connected to a grounded resistor 442. A resistor 444 is connected between potentiometer 432 and lead 182. A resistor 446 is connected to the junction of resistor 444 and potentiometer 432. A resistor 448 is connected to the junction of potentiometer 432 and resistor 446, opposite resistor 444. Resistor 448 is connected to output terminal 426. A lead 449 is connected to resistor 448. A resistor 450 is connected to lead 449 and resistor 446. Resistor 450 is also connected to output terminal 440 of operational amplifier 436. A resistor 451 is connected between output terminal 426 and resistor 448.

A diode 452 is connected to output terminal 440 of operational amplifier 436. A resistor 454 is connected to output terminal 440. A light-emitting diode 456 is connected between resistor 454 and lead 194. A light-emitting diode 462 is connected to resistor 461. Light-emitting diode 462 is connected to lead 194. A diode 463 is connected to output terminal 426.

A lead 464 is connected to diode 452. A jumper 465 is adapted to connect selectively lead 464 to lead 198. A lead 466 is connected to diode 463. A jumper 467 is adapted to connect selectively lead 466 to lead 198.

Lead 270 is connected to the absolute value difference sensor 45 at absolute value difference amplifier 46 through a pair of resistors respectively numbered 469 and 470. A lead 471 is connected to resistor 469. A lead 472 is connected to resistor 470. Absolute value difference amplifier 46 has a first operational amplifier 476. Operational amplifier 476 has an inverting terminal 478, a non-inverting terminal 480 and an output terminal 482. A resistor 484 is connected to inverting terminal 478. Lead 364 is connected to inverting terminal 478 through resistor 484. A resistor 486 is also connected to inverting terminal 478. Resistor 486 is connected to output terminal 482; and is, in turn, connected to a resistor 488. A resistor 490 is connected to non-inverting input terminal 480 of operational amplifier 476. Resistor 490 is grounded. A resistor 492 is connected to output terminal 482 of operational amplifier 476. Resistor 492 is connected to resistor 469, through lead 471, at an inverting terminal 494 of an operational amplifier 496. Operational amplifier 496 has a non-inverting terminal 498 and an output terminal 500. Operational amplifier 496 also has a pair of power terminals, respectively numbered 502 and 504. Operational amplifier 496 is an MLM 108 AG precision operational amplifier. Terminals 502 and 504 are connected by a capacitor 506. Terminal 498 is grounded. A terminal 508 is connected to ground by a capacitor 510. A resistor 512 is connected to inverting terminal 494. A diode 514 is connected to resistor 512 and to output terminal 500. A diode 516 is connected between output terminal 500 and lead 471, which is connected to input terminal 494. A resistor 518 is connected to diode 514. Lead 472, resistor 518, and resistor 488 are connected to an inverting input terminal 520 of an MLM 108 AG precision operational amplifier 522. Operational amplifier 522 also has a non-inverting input terminal 524 and an output terminal 526. Non-inverting input terminal 524 is connected to ground. Terminal 528 is connected to a capacitor 530. Capacitor 530 is grounded. A pair of power terminals, respectively numbered 532 and 534, is connected together by a capacitor 536. A resistor 538 is connected to input terminal 520. A potentiometer 540 is connected to resistor 538 in a variable resistor mode. A capacitor 542 is connected in parallel, with resistor 538 and potentiometer 540, to resistor 488. Potentiometer 540 is connected to output terminal 526 of operational amplifier 522. A resistor 544 is also connected to output terminal 526. A remote sensing port 545 is connected to resistor 544. A diode 546 is, likewise, connected to output terminal 526 and ground. A second diode 548 is also connected to output terminal 526 and to lead 198. A tap 549 is connected between resistor 544 and remote sensing port 545.

An operational amplifier 550 of voltage difference comparator 47, having an inverting terminal 552, a non-inverting terminal 554 and output terminal 556, is connected to diode 548 at inverting terminal 552. Non-inverting terminal 544 is connected to a potentiometer 558 through a tap 560. Potentiometer 558 is connected in series with a resistor 562. Resistor 562 is grounded. A resistor 566 is connected in series with resistors 558 and 564. Resistor 566 is connected to lead 182. A resistor 568 is connected between resistor 564 and output terminal 556 of operational amplifier 550. A light-emitting diode 570 is connected to output terminal 556 of operational amplifier 550. A resistor 572 is connected to light-emitting diode 570. Resistor 572 is connected to lead 194. A diode 574 is connected to the junction of light-emitting diode 570 and output terminal 556 of operational amplifier 550. A voltage difference output lead 576 is connected to diode 574. A resistor 578 is connected between lead 576 and ground. A jumper 577 is adapted to be connected selectively between lead 576 and lead 198.

The dead bus comparator 48 is connected to lead 270 from alternating current to direct current converter 41. Lead 270 is connected to an operational amplifier 579 at an inverting input terminal 580. The operational amplifier 579 has a non-inverting input terminal 582 and an output terminal 584. A pair of power terminals, respectively numbered 586 and 588, is also included with operational amplifier 579. Power terminal 586 is connected to lead 194. Power terminal 588 is connected to lead 194. A capacitor 590 is connected between terminals 586 and 588. Noninverting terminal 582 is connected to a potentiometer 592 at a tap 594. A resistor 596 is connected in parallel with potentiometer 592. A resistor 598 is connected in series with resistor 596 and to ground. A resistor 600 is connected in series with potentiometer 592 and resistor 596. Resistor 600 is also connected to lead 182. A resistor 602 is connected to a junction between potentiometer 592 and resistor 596 and to output terminal 584 of operational amplifier 579. A resistor 604 is connected to resistor 602. A light-emitting diode 605 is connected between resistor 604 and lead 198.

A dead bus time delay circuit 606 is connected to output terminal 584. Dead bus time delay circuit 606 includes 300 kilohm resistor 607, which is connected to output terminal 584 of operational amplifier 578. A 10 kilohm resistor 608 is connected to output terminal 584 of operational amplifier 578. A diode 610 is connected in series with resistor 608. Resistor 607 is connected in parallel with the series combination of resistor 608 and diode 610. A resistor 612 is connected between diode 610 and ground. A lead 613 is connected between resistor 612 and diode 610. A lead 614 is connected to resistor 607 and lead 613. A diode 615 is connected to lead 614. A capacitor 616 is connected in parallel with diode 615 to lead 614. Diode 615 and capacitor 616 are also connected to ground.

In a similar fashion, the dead line comparator 52 is connected to alternating current to direct current converter 42. The dead line comparator 49 includes an operational amplifier 617, having an inverting input terminal 618, a non-inverting terminal 620, an output terminal 622, and a pair of power terminals, respectively numbered 624 and 626. Terminals 624 and 626 are connected by a capacitor 628. Terminal 624 is connected to lead 198. Terminal 626 is connected to lead 194. Input inverting terminal 618 is connected to lead 364. Non-inverting terminal 620 is connected to a potentiometer 628 at a tap 630. A resistor 632 is connected in series with potentiometer 628. Resistor 632 is connected to lead 182. A resistor 634 is connected in series with resistor 632, and in parallel with potentiometer 628. A resistor 636 is connected in series with resistor 634 and potentiometer 628, and is also connected to ground. A resistor 638 is connected to output terminal 622. A resistor 642 is connected to output terminal 622 of operational amplifier 617 and to resistor 638. Resistor 642 is connected to a light-emitting diode 643. The light-emitting diode 643 is connected to lead 198.

A dead line time delay circuit 644 is connected to output terminal 622 of operational amplifier 617. Dead line time delay circuit 644 includes a diode 645, which is connected to output terminal 622. A 10 kilohm resistor 646 is connected in series with diode 645. A 300 kilohm resistor 647 is connected in parallel with diode 645 and resistor 646. A capacitor 648 is connected between resistor 646 and resistor 647. Capacitor 648 is grounded. A resistor 649 is connected to resistor 647. Resistor 649 is grounded. A diode 650 is connected in parallel with resistor 649.

Both the dead bus comparator 48 and the dead line comparator 49 are connected to dead line-dead bus logic system 50. Dead line-dead bus logic 50 includes an integrated circuit inverter 651, which is connected to lead 614. Integrated circuit inverter 651 is connected to an AND gate 652; having a first input terminal 654, a second input terminal 656, and an output terminal 657. Lead 614 is connected to an AND gate 658. AND gate 658 has a first input terminal 660, a second input terminal 662 and an output terminal 664. Input terminal 660 is connected to lead 614. An integrated circuit inverter 666 is connected between input terminal 656 of AND gate 652 and input terminal 662 of AND gate 658. Inverter 666 is connected to a junction of resistors 646, 647, and 649; capacitor 648 and diode 650. A dead line override lead 668 is connected to output terminal 657 of AND gate 652. A dead bus override lead 670 is connected to output terminal 664 of AND gate 658.

A multiple contact bus relay 676 is connected to bus override lead 670. Bus relay 676 has a pair of normally open relay contacts 678 and 680. Contacts 678 and 680 are connected in parallel by a pair of leads 681 and 682. Lead 681 is connected to lead 664 of AND gate 658. Lead 682 is connected to a diode 684.

Relay 676 also has a relay coil 686 to which is connected a diode 688. A diode 689 is connected to coil 687 and diode 688. Diode 689 is also connected to tap 143. A fuse 690 is connected to diode 668 and coil 687 opposite diode 689. A remote contact 691 is connected to fuse 690. A ground remote contact 692 is positioned adjacent remote contact 691. A diode 693 is connected to coil 687, diode 668, fuse 690 and to ground.

A diode 694 is connected back-biased to diode 684. A master override lead 695 is connected to a junction formed by diodes 684 and 694. Diode 694 is connected to a line relay 696 at a lead 697. Bus relay 696 also has a pair of normally open contacts 698 and 699, which are connected in parallel by a lead 700 and lead 697. Relay 696 has an internal relay coil 704, which is connected in parallel with a diode 706. A diode 707 is connected to a junction of coil 704 and diode 706 and to lead 143. A diode 708 is connected to coil 704 and diode 706, opposite diode 707. A fuse 709 is connected to diode 708. A remote contact 710 is connected to fuse 709. A remote contact 711, positioned adjacent to panel contact 710 is connected to ground. Diode 708 is also connected to ground.

The voltage output logic system 54 is connected to the lower voltage comparator 43, to the upper voltage comparator 44 and to the voltage difference comparator 47. A bus lead 714 is connected to diode 416 of lower voltage comparator 23. A line lead 716 is connected to diode 414 of lower voltage comparator 23. A resistor 720 is connected to bus lead 714 and to ground. A resistor 722 is connected to line lead 716 and to ground. An integrated circuit inverter 724 is connected to lead 714, opposite resistor 720. An integrated circuit inverter 726 is connected to lead 716, opposite resistor 722. Inverter 724 is connected to an input terminal 728 of a lower voltage AND gate 730. Lower voltage AND gate 730 also has a second input terminal 732 and an output terminal 734. Inverter 726 is connected to input terminal 732 of the lower voltage AND gate 730. A lower voltage gate lead 737 is connected to output terminal 734.

A resistor 738 is connected to line lead 464 of upper voltage comparator 34. Resistor 738 is grounded. A resistor 739 is connected to bus lead 466 of upper voltage comparator 24. Resistor 739 is grounded. Resistor 738 is connected to an input terminal 740 of an upper voltage AND gate 742. Upper voltage AND gate 742 has a second input terminal 743 and an output terminal 744. Bus lead 466 is connected to input terminal 743. An upper voltage gate lead 745 is connected to output terminal 744.

A lower and upper voltage AND gate 746 has a pair of power terminals 747 and 748. Power terminal 747 is grounded. Power terminal 748 is connected to lead 198. A capacitor 749 is connected between terminal 748 and ground. Lower and upper voltage AND gate 746 also has a first input terminal 750, a second input terminal 752 and an output terminal 753. Input terminal 750 is connected to upper voltage gate lead 745. Input terminal 752 is connected to lower voltage gate lead 737. Output terminal 753 is connected to an upper and lower voltage gate lead 754.

A master voltage AND gate 755 has a first input terminal 756, a second input terminal 757 and an output terminal 758. First input terminal 756 is connected to lower and upper voltage gate lead 754. Input terminal 757 is connected to lead 576 from the voltage difference comparator. A voltage relay lead 759 is connected to output terminal 758.

A voltage indicator 760 is connected to voltage relay lead 759. Voltage indicator 760 includes a resistor 761 connected to lead 759. An NPN transistor 762; having a base 763, an emitter 764 and a collector 765, is connected to resistor 761 at base 763. Emitter 764 is connected to ground. A voltage indicating relay 766 is connected to collector 765. Voltage indicating relay 766 has a coil 767 and a diode 768 connected in parallel with coil 767. One end of coil 767 and diode 768 is connected to collector 765. The other end of coil 767 and diode 768 is connected to lead 141. Voltage indicating relay 766 has a pair of normally open contacts 769, to which is connected a plurality of external contact points numbered 770 and 771, 772 and 773 respectively.

Output terminal 758 is also connected to a resistor 774. A diode 775 is connected in series with resistor 774. Diode 775 is connected to ground through a resistor 776. A capacitor 777 is connected in parallel with resistor 776. Both capacitor 777 and resistor 776 are connected to a master voltage output lead 778.

The zero crossing detector 51 is connected to the first transformer 70 at secondary winding 74 and to the second transformer 114 at secondary winding 118. A resistor 816 is connected to secondary winding 74. A diode 818 is connected to resistor 816. An external tap 819 is connected between resistor 816 and diode 818. In a similar fashion, a resistor 820 is connected to secondary winding 118. A diode 822 is connected to resistor 820. An external tap 823 is connected between resistor 820 and diode 822. Diodes 818 and 822 are connected to a resistor 824 and to a diode 826. Resistor 824 is connected to lead 198. Diode 826 is grounded. A lead 827 is connected to the junction of resistor 824 and diode 826. A pair of diode taps, respectively numbered 828 and 829, is connected to lead 827. Lead 827 is connected to an NPN transistor 830, having a base 832, a collector 834 and an emitter 836. Transistor 830 is connected at base 832 to diodes 828 and 829. Transistor 830 is connected at collector 834, to a resistor 837. Resistor 837 is connected to lead 182. Emitter 836 is connected to ground. NAND gate 838 has a pair of input terminals, respectively numbered 839 and 840. NAND gate 838 also has an output terminal 841. Input terminals 839 and 840 are connected to collector 834. A NAND gate 842 has a pair of input terminals, respectively numbered 843 and 844; and an output terminal 845. Input terminals 843 and 844 are connected to collector 834. Output terminals 841 and 845 are connected together. Output terminals 841 and 845 of NAND gate 838 and 842 are connected to a lead 847.

A resistor 848 and a grounded capacitor 850 comprise a portion of active filter 52. Resistor 848 is connected to lead 847. A lockout lead 851 is connected to a junction of resistor 848 and capacitor 850. The junction of resistor 848 and capacitor 850 is connected to a resistor 852. Resistor 852 is connected to a capacitor 854 and a resistor 856. Capacitor 854 is, in turn, connected to a lead 858. A first diode 860, which is normally back-biased against lead 198, is connected to lead 858. A second diode 862 is connected in parallel with diode 860 to lead 858, back-biased with respect to lead 194. A lead 864 is connected to lead 858 between capacitor 854 and diode 860. Lead 864 is connected to an operational amplifier 866, at an inverting input terminal 868. Operational amplifier 866 also has a non-inverting input terminal 870, an output terminal 872, and a pair of power terminals, respectively numbered 874 and 876. Power terminals 874 and 876 are cross-connected by a capacitor 882. An additional pair of terminals is identified by numerals 884 and 886. Terminals 884 and 886 are connected together by a potentiometer 888. Potentiometer 888 has a tap 890, which is connected to lead 198. Input non-inverting terminal 870 of operational amplifier 866 is connected to a junction of resistor 856 and a capacitor 891. Capacitor 891 is grounded. A resistor 892 is connected to diode 862 and output terminal 872 of operational amplifier 866. A remote sensing port 893 is connected to resistor 892.

Scaling amplifier 53 is connected to output terminal 872. Scaling amplifier 53 includes an operational amplifier 894 having a non-inverting terminal 896, an inverting terminal 898 and an output terminal 900. Non-inverting terminal 896 is connected to output terminal 872 of operational amplifier 866; and is also connected to lead 858 and to diode 862. A resistor 904 is connected between output terminal 900 and inverting input terminal 898 of operational amplifier 894. A resistor 906 is connected to a junction between terminal 898 and resistor 904, and is grounded. An external tap 907 is connected to output terminal 900. A resistor 908 is connected to a junction of output terminal 900 and external tap 907.

Phase angle comparator 35 includes an operational amplifier 910, having a non-inverting input terminal 912; an inverting terminal 914; and an output terminal 916. Non-inverting input terminal 912 is connected to resistor 908. A pair of power terminals, respectively numbered 918 and 920, is respectively connected to leads 198 and 194. A capacitor 921 connects terminals 918 and 920 together. A resistor 922 is connected between non-inverting input terminal 912 and output terminal 916. A capacitor 924 is connected in parallel with the resistor 922. Inverting input terminal 914 is connected to a potentiometer 926, at a tap 928. Potentiometer 926 is connected in parallel with a resistor 930. Potentiometer 926 and resistor 930 are connected in series with a resistor 932. Resistor 932 is connected to lead 182. A removable jumper 933 is selectively connectable to a point between resistor 930 and resistor 932. Jumper cable 933 is connectable to a resistor 934. Resistor 934 is selectively connectable through a normally open contact 935 to ground. Contact 935 is a portion of a range control relay 936. Range control relay 936 also has a second normally open contact 937. A coil 938 controls contacts 935 and 937. A diode 939 is connected in parallel with coil 938. A diode 940 is connected between coil 938 and lead 143. A diode 941 is connected to coil 938 opposite diode 940 and to ground. A fuse 942 is connected to coil 938 adjacent to diode 941. A remote contact point 943 is connected to fuse 942. A remote contact point 944 is connected to ground, adjacent to remote contact point 943. A resistor 945 is connected to potentiometer 926 and resistor 930. Resistor 945 is connected to ground. A light-emitting diode 946 is connected to output terminal 916 of operational amplifier 910. Light-emitting diode 946 is connected to a resistor 947. Resistor 947 is connected to lead 198. A diode 948 is connected to capacitor 924 and resistor 922 at the point at which they are joined to output terminal 916 of operational amplifier 910.

Timer 36 is connected to diode 948. Timer 36 includes a lead 949 which is connected to diode 948. An inverter 950 has a pair of power terminals, respectively numbered 951 and 952, an input terminal 954 and an output terminal 956. Power terminal 951 is connected to lead 198. Power terminal 952 is connected to ground. Input terminal 954 is connected to lead 949. A phase indicating lead 958 is connected to output terminal 956. A lead 959 is also connected to output terminal 956. A resistor 960 is connected to output terminal 956. A resistor 961 is connected to lead 949. A transistor 962 has a base 964, a collector 966 and an emitter 968. Base 964 is connected to resistor 960. Emitter 968 is connected to ground. Collector 966 is connected to a resistor 970. A capacitor 972 is connected to resistor 970, and is grounded. Resistor 970 is also connected to resistor 960, which are both in turn connected to an operational amplifier 974.

Operational amplifier 974 has an inverting input terminal 976, a non-inverting input terminal 978, an output terminal 980 and a pair of power terminals, respectively numbered 982 and 984. Power terminals 982 and 984 are respectively connected to lead 198 and lead 194. Power terminals 982 and 984 have a capacitor 986 connected thereacross. Non-inverting terminal 978 is connected to resistor 960 and capacitor 972. Inverting terminal 876 is connected to a potentiometer 988 at a tap 990. Potentiometer 988 is connected in parallel with a resistor 992. Resistor 992 and potentiometer 944 are connected in series with a potentiometer 944, connected as a variable resistor. A resistor 996 is connected to variable resistor 994 and to lead 198. A resistor 998 is connected in series with potentiometer 944 and resistor 992, and is grounded. A jumper 1000 is selectively connectable to a junction of potentiometer 944 and resistor 992, and to a resistor 1002. Contact 937 is selectively connectable to resistor 1002. A diode 1005 is connected to ground.

A resistor 1006 is connected to output terminal 980 of operational amplifier 974. A diode 1007 is connected between resistor 1006 and lead 959. A lead 1008 is connected to a junction of resistor 1006 and diode 1007. Diode 1005 is also connected to lead 1008.

A phase condition indicator 1010 is connected to phase output lead 958. Phase condition indicator 1010 includes a resistor 1012 connected to lead 958. A transistor 1014 has a base 1016, a collector 1018 and an emitter 1020. Base 1016 is connected to resistor 1012. Emitter 1020 is grounded. Collector 1018 is connected to a relay coil 1022. A diode 1024 is connected in parallel with relay coil 1022. Relay coil 1022 and diode 1024 are connected to lead 141, opposite emitter 1018. A first normally open contact 1026 is positioned adjacent to coil 1022. A first remote contact point 1028, and a second remote contact point 1030 are connected to contact 1026. A second normally open contact 1032 is positioned adjacent to contact 1026. A first remote contact point 1034 and a second remote contact point 1036 are connected to contact 1032.

Power relay logic 55 includes a phase and timer AND gate 1040. Phase and timer AND gate 1040 has a first input terminal 1042, a second input terminal 1044, an output terminal 1046 and a pair of power terminals, respectively numbered 1048 and 1050. Input terminal 1042 is connected to lead 959 and diode 1007. Input terminal 1044 is connected to diode 1005 and lead 1008. Power terminal 1048 is connected to lead 198. A capacitor 1052 is connected between power terminal 1048 and ground. Power terminal 1050 is connected to ground. A diode 1054 is connected to output terminal 1046.

A sync check inhibit system 1056 is connected to gate 1040. Sync check inhibit system 1056 includes a relay coil 1058. Relay coil 1058 and diode 1060 are connected to lead 143. A diode 1062 is connected to relay coil 1058 and diode 1060, opposite lead 143. A fuse 1064 is connected to diode 1062. A remote contact point 1066 is connected to fuse 1064. A diode 1068 is connected to a junction of diode 1062 and fuse 1064. The other lead of diode 1068 is grounded. A normally open contact 1070 is positioned adjacent to coil 1058. A normally open contact 1072 is connected in parallel with contact 1070. Contacts 1070 and 1072 are connected to ground. Contacts 1070 and 1072 are also connected to a sync check inhibit line 1074. Synch check inhibit line 1074 is connected to lead 1008 and input terminal 1042 of gate 1040.

A diode 1076 is connected to master override lead 695. Diodes 1076 is also connected to master voltage control lead 778. A diode 1078 is connected to lead 695, adjacent to diode 1076. Diode 1078 is connected, back-biased, to diode 1054. A lead 1080 is connected to a junction of diode 1054 and 1078. A lead 1081 is connected to lead 1080. A resistor 1082 is connected to lead 1081. A capacitor 1084 is connected in parallel with resistor 1082. Resistor 1082 and capacitor 1084 are connected to ground. A master breaker control gate 1086 has a first input terminal 1088, a second input terminal 1090 and an output terminal 1092. Input terminal 1088 is connected to a junction of lead 1080, resistor 1082 and capacitor 1084. Input terminal 1090 is connected to master voltage control lead 778. A Zener diode 1094 is connected to output terminal 1092.

Voltage lockout 1110 is connected to power supply 20. Voltage lockout 1110 includes a diode 1112 connected to a junction of diode 91 and resistor 92. A resistor 1114 is connected to diode 1112. A resistor 1116 is connected to resistor 1114 and to ground. A NAND gate 1118 has a first input terminal 1120, a second input terminal 1122 and an output terminal 1124. Input terminals 1120 and 1122 are connected to a lead 1126. Lead 1126 is connected to resistor 1116. A diode 1128 is connected to output terminal 1124. A capacitor 1130 is connected to lead 1126 and to ground. A diode 1132 is connected to capacitor 1130. A lead 1134 is connected to diode 1132. Lead 1134 is connected to lead 182. A resistor 1138 is connected to a junction of diodes 84 and 90. A resistor 1140 is connected to resistor 1138. Resistor 1140 is also connected to ground. A NAND gate 1142, having a first input terminal 1144, a second input terminal and an output terminal 1148, is connected to resistor 1138 at input terminals 1144 and 1146. A diode 1050 is connected to output terminal 1158. A capacitor 1152 is connected to input terminals 1144 and 1146. Capacitor 1152 is also connected to ground. Diodes 1128 and 1150 are connected to lead 851.

Power relay circuit 55 is connected to Zener diode 1094. Power relay circuit 55 includes a transistor 1160, having a base 1162, a collector 1164 and an emitter 1166. Base 1162 is connected to Zener diode 1094. A resistor 1168 is connected to collector 1164. Resistor 1168 is also connected to lead 198. A resistor 1170 is connected to emitter 1166. Resistor 1170 is also connected to ground. A transistor 1172 has a base 1174, a collector 1176 and an emitter 1178. Base 1174 is connected to emitter 1166. Emitter 1178 is connected to ground. A relay 1180 is connected to collector 1176. Relay 1180 has a coil 1182. A diode 1184 is connected in parallel with coil 1182. Coil 1182 and diode 1184 are connected to collector 1176. Coil 1182 and diode 1184 are connected to lead 144 opposite collector 1176. A movable switch contact 1186 is positioned adjacent coil 1182. A first external contact 1188 is selectively connectable to moving contact 1186. A second external contact 1190 is selectively connectable to moving contact 1186.

In use, a first alternating current potential is present at bus lead 16. The potential commonly is 345,000 volts with respect to ground. However, the potential may be at other voltages as well. The 345,000 volt potential is stepped down through external bus potential transformer 24. The stepped down potential 1200 is supplied to terminal 57 and is grounded at terminal 58. The potential is filtered through capacitors 60 and 65. Varistors 66 and 68 also provide smoothing to the potential. A relatively transient-free 60 Hertz alternating current voltage is supplied to primary winding 72 of transformer 70. The voltage is stepped down by transformer 70. The secondary leads 76 and 78, supply the first stepped down voltage 1202 to full wave rectifier bridge 82.

In a similar fashion, a second alternating current line voltage 1204 is stepped down by transformer 25 and is received at points 96 and 98. The voltage is filtered through capacitors 106 and 108, and varistors 110 and 112. A relatively transient-free 60-cycle alternating current voltage is supplied to primary winding 116 of transformer 114. The second voltage is stepped down and inverted by transformer 114. The secondary leads 120 and 122 supply a second stepped down voltage 1206 to full wave rectifier bridge 126. Full wave rectifier bridge 126 is connected in parallel with full wave rectifier bridge 82, so that additional averaging of the stepped down voltages takes place within power supply 20.

Full wave rectifier bridge 82 rectifies the first stepped down voltage. Full wave rectifier bridge 126 rectifies the second stepped down voltage. Resistor 92 and capacitor 94 filter the first stepped down rectified voltage. A positive 24-volt raw, or fluctuating, potential is provided at take-off lead 141. The Zener diode 146 provides over-voltage protection to integrated circuit 150 and integrated circuit 174. In a similar fashion, resistor 138 and capacitor 140 filter the second stepped down rectified voltage to provide a negative 24-volt raw, or fluctuating, potential, at tap 143. Zener diode 148 also provides over-voltage protection to integrated circuit 150 and integrated circuit 174. The 24-volt potentials are allowed to fluctuate because they are employed as driving voltages for relays only.

Integrated circuit 150 is an integrated circuit voltage regulator. Capacitors 186 and 190 act as low-pass filters. Resistor 192 determines the voltage output of integrated circuit 150. Resistor 188 sets an internal reference current for integrated circuit 150. The hybrid 10-volt reference 174 provides a very steady voltage output having a positive 10-volt potential. The hybrid 10-volt reference 174 is extremely stable with respect to input voltage, load current, temperature and time. References 174 generates all reference supply potentials used in the synchronizing check relay. The 10-volt reference potential is further filtered by capacitor 184. Tap 185 is connectable to a measuring instrument to observe the reference supply potential during circuit operation. The integrated circuit 150 provides a regulated positive 15-volt potential at lead 198. The positive 15-volt potential is further filtered by capacitor 200 and can be measured at tap 201. The integrated circuit voltage regulator 150 also supplies a regulated negative 15-volt potential at lead 194. The negative 15-volt potential is further filtered by capacitor 196 and can be sensed at tap 195. A grounding voltage can be sensed at tap 197. Power supply 40 is stable, since it is driven both from the first A.C. voltage and the second A.C. voltage and has several regulation stages. The voltages produced by integrated circuits 150 and 174 are substantially independent.

Alternating current to direct current converter 41 and alternating current to direct current converter 42 are identical. Alternating current to direct current converter 41 may be taken as the exemplary alternating current to direct current converter. Transformer 206 receives the first A.C. potential from the first potential transformer 24. The potential is stepped down to approximately 6 volts root means square. The next operation of alternating current to direct current converter 41 must be examined in two stages.

When the potential present at the junction of resistors 238 and 216 is a positive potential, operational amplifier 220 acts as a unity gain inverting amplifier, since diode 231 is conducting. The potential present at the junction of resistor 234 and diode 231, for a positive input potential, is exactly equal to the negative of the positive input potential. This negative output potential is then supplied to operational amplifier 252 at input terminal 250 and is thereby amplified, and smoothed through capacitor 272. Thus, a smooth 6-volt D.C. output is produced for the positive half of the input waveform. Diodes 228 and 230 provide grounding protection to input terminal 222 of operational amplifier 220. In a similar fashion, diodes 220 and 242 protect input terminal 250 of operational amplifier 252.

When the input voltage is negative, the diode 231, connected in the feedback loop of operational amplifier 220, is non-conducting and diode 232 becomes conducting. Diode 232 holds input terminal 222 of operational amplifier 220 at a virtual ground; and thereby effectively holds input terminal 250 of operational amplifier 252 at a virtual ground. Thus, operational amplifier 220 is dropped out of the circuit for the negative portion of the input voltage. The negative voltage, however, is supplied through resistor 238 to input terminal 250 of operational amplifier 252 where it is amplified and smoothed by capacitor 272. The amount of amplification is controlled by potentiometer 266.

Thus, alternating current to direct current converter 41 inverts positive portions of the waveforms through its first operational amplifier 220 and again inverts and amplifies the negative potential through operational amplifier 252 where the potential waveforms are also smoothed. Negative portions of incoming waveforms are blocked from operational amplifier 220 and supplied directly to the second operational amplifier 252, where they are inverted to a positive outgoing D.C. signal. Thus, a first direct current potential proportional to an amplitude of the first alternating current potential is produced by alternating current to direct current converter 41. Alternating current to direct current converter 42 works in identical fashion to alternating current to direct current converter 31 and produces a second direct current potential proportional to an amplitude of the second alternating current line potential. Both the first and second direct current potentials are positive potentials.

Diodes 272 and 274 protect lead 270 from surges through remote sensing port 278. A suitable measuring instrument can be connected to port 278 to monitor the first direct current potential. Diodes 366 and 368 protect lead 364 from surges through remote sensing port 370. A suitable measuring instrument can be connected to remote sensing port 370 to monitor the second direct current potential.

Lower voltage comparator 43 receives the first direct current potential at inverting terminal 372 of operational amplifier 374. A selected lower voltage reference potential is supplied to the non-inverting terminal 376 of operational amplifier 374 from potentiometer 398. The lower voltage reference potential is a positive potential.

The lower voltage reference potential is very stable since it is fed from hybrid voltage regulator 174. A first hysteresis potential is supplied to potentiometer 398 through resistor 406. The first hysteresis potential provides for a sharp switching point for operational amplifier 374. Potentiometer 398 is a 50 kilohm potentiometer. Resistor 404 is a 5.62 kilohm resistor. Potentiometer 398 taken alone, commonly has a 10% margin or error. When potentiometer 398 is connected in parallel with resistor 404, a very accurate 5 kilohm potentiometer is simulated.

Operational amplifier 386 receives the second direct current potential at inverting terminal 388. Non-inverting terminal 390 receives the lower voltage reference potential from potentiometer 398. A second hysteresis potential is supplied through resistor 408 to potentiometer 398 to provide a sharp switching point for operational amplifier 386. Potentiometer 398 is adjustable to provide an adjustable lower reference voltage to operational amplifier 374 and 386. The potential supplied to operational amplifier 374 and 386 has a range corresponding to an input voltage range of 90 to 120 volts.

Operational amplifier 374 acts as a comparator between direct current potential lead 372 and lower voltage reference level lead 396. When the first direct current voltage is greater than the lower voltage reference potential output terminal 378 is negative; causing light-emitting diode 418 to light; and holding a potential at diode 416 low. When the lower voltage reference potential is larger than the first direct current potential operational amplifier 374 produces a positive output, blocking and extinguishing diode 418. The positive output also drives diode 416 to a high voltage producing a high voltage at lead 714.

When the second direct current potential is greater than the lower voltage reference potential, operational amplifier 392 produces a negative output at output terminal 392, thereby lighting light-emitting diode 412. Diode 414 is held off, producing a low voltage state at lead 716. When the second direct current potential is less than the lower voltage potential output terminal 392 has a positive potential. The positive potential of output terminal 392 blocks light-emitting diode 412, thereby extinguishing it. When output terminal 392 has a positive voltage, diode 414 conducts and produces a high potential lead 716. Thus, diodes 418 and 412, when lit, indicate that the first and second A.C. line potentials are above a preselected lower voltage comparator minimum. When diode 418 or diode 412 are extinguished, a visual indication is provided that the first or second A.C. potentials, respectively, have dropped below the preselected lower voltage comparator minimum.

Lower voltage comparator 43 can be effectively removed from the synchronizing check relay by simply disconnecting diodes 414 and 416. Lower voltage comparator 43 operates independently of phase sensor 33, timer 36, upper voltage comparator 44 and absolute value detector 45. Lower voltage comparator 43 is also substantially temperature independent over a temperature range from −40° C. to +80° C.

Upper voltage comparator 44 receives the first direct current potential at inverting terminal 422 of operational amplifier 420. An upper voltage reference potential, which is adjustable, is supplied to non-inverting terminal 424 of operational amplifier 420 by potentiometer 432 which is a 50 kilohm potentiometer. Resistor 446 is a 5.62 kilohm resistor. Potentiometer 432 simulates a highly accurate 5 kilohm potentiometer.

Operational amplifier 436 receives the second direct current potential at inverting terminal 438. Operational amplifier 436 receives the upper voltage reference potential at noninverting terminal 434.

When the first direct current voltage is less than the upper voltage reference potential, output terminal 426 of operational amplifier 420 is positive, causing light-emitting diode 462 to light, and producing a high potential at lead 466. When the first direct current potential exceeds the upper voltage reference limit output, terminal 426 is at a negative potential holding light-emitting diode 462 off. When output terminal 422 is negative, diode 463 is blocked, thereby holding lead 466 at a low potential.

When the second direct current potential is less than the upper voltage reference potential output terminal 440 of operational amplifier 436 produces a positive potential, which lights light-emitting diode 456. The positive potential also is conducted through diode 452, causing lead 464 to be at a high potential. When the second direct current potential is greater than the upper voltage reference potential the output terminal 440 is at a negative potential, thereby blocking light-emitting diode 456 and holding it off. Diode 452 is held nonconducting and lead 464 is at a low potential.

The upper reference potential in this embodiment is typically adjustable between 110 and 140 volts as seen at input circuits 38 and 39. The upper voltage comparator 44 is also effectively removable from synchronizing check relay 10 by installing jumpers 465 and 467 as shown in the drawings. Upper voltage comparator 44 operates independently of phase sensor 33, timer 36, lower voltage comparator 43 and absolute value detector 45. Upper voltage comparator 44 is also substantially temperature independent over a range of −40° C. to +80° C. When upper voltage comparator 44 is removed from the synchronizing check relay, jumpers 465 and 467 must be connected in order that synchronizing check relay may operate properly.

The operational amplifier 476 of the absolute value difference amplifier 46 receives the second direct current potential at inverting terminal 478. The second direct current potential is reversed in polarity through the unity gain amplifier 476 and outputted at the same potential magnitude level through output terminal 482. Operational amplifier 496 receives inverted input at terminal 494 and also receives the first direct current potential at terminal 494. A net circulating current exists between resistors 470 and 492. When the first direct current potential and the second direct current potential are not equal, a net current must be flowing either through resistor 512 or through diode 516. When the first direct current potential is greater than the second direct current potential, diode 516 is blocked and current flows through resistor 512 and diode 514, thus insuring that operational amplifier 496 is performing an amplifying function. The output of operational amplifier 496 is then supplied to the final summing amplifier 522, which provides a first absolute value output.

When the second direct current potential is greater than the first direct current potential, diode 514 is blocked and diode 516 becomes conducting, effectively holding input terminal 494 of operational amplifier 496 at a virtual ground, and taking operational amplifier 496 out of the absolute value difference amplifier circuit 46. The inverted second direct current potential is then supplied through resistor 488 to input terminal 520 of operational amplifier 522 where it is combined with the non-inverted input from the first direct current potential. This potential is supplied through resistor 470. The two potentials are added and the difference between the absolute values of the two potentials is supplied at output terminal 526. Diodes 546 and 548 perform a voltage protection function for operational amplifier 542 in order that an external analog detector can be connected to resistor 544 to sense the output of absolute value difference amplifier 46 at remote sensing port 545.

The difference signal is supplied to inverting terminal 552 of operational amplifier 550 of the voltage difference comparator 47. A preselected voltage difference reference potential is supplied to non-inverting terminal 554 of operational amplifier 550 by potentiometer 558. Operational amplifier 550 acts as a comparator. Operational amplifier 550 produces a positive output as long as the voltage at terminal 552 does not exceed the voltage present at terminal 554. As long as the output from the operational amplifier 550 remains positive, light-emitting diode 570 remains lit and a high potential is provided to lead 576. When the difference signal is greater than the voltage difference reference potential, the operational amplifier output goes negative. When the operational amplifier output goes negative, light-emitting diode 570 is extinguished and lead 576 has a low potential.

Voltage output logic 54 includes lower voltage AND gate 730. Lower voltage gate 730 receives an inverted potential at input terminal 728; which is inverted with respect to the potential at line 714. Similarly, the potential present at line 716 is inverted by inverter 726; and the inverted potential is fed to input terminal 732. Thus, as long as the potential at line 714 and the potential at line 716 are both low, output terminal 734 of gate 730 is held high. When either or both of the potentials at line 714 and 716 are high, output terminal 734 of gate 730 is low. The high potential on lead 714 is a bus low voltage breaker closing inhibit signal. The high potential on lead 716 acts as the line low voltage breaker closing inhibit signal. A low potential at line 737 is a low voltage breaker closing inhibit signal. A high output at terminal 734 indicates that both direct current potentials are greater than the lower voltage reference. Resistors 720 and 722 protect inverters 724 and 726. When the lower voltage comparator is removed from the synchronizing check relay, inverters 724 and 726 receive low potentials, which drive terminals 728 and 732 of gate 730 high. An output terminal 736 of gate 730 also has a high potential. Upper voltage AND gate 742 receives a pair of potentials from leads 464 and 466 of upper voltage comparator 44. When the potentials at leads 464 and 466 are both high, output terminal 744 of gate 742 is high. A high output from terminal 744 indicates that both direct current voltages are less than the selected upper voltage limit. When either direct current voltage goes higher than the selected upper voltage limit, a low voltage is correspondingly supplied to lead 464 or 466 causing output terminal 744 to go low. A low voltage at lead 474 constitutes an upper voltage breaker closing inhibit signal.

Upper and lower voltage gate 746 receives the potential of lead 745 at input terminal 750, and the potential of lead 737 at input terminal 752. As long as the potentials on leads 737 and 745 are both high, an output potential at output terminal 753 is also high. When either of or both leads 737 or 745 have a low potential indicative of a breaker closing inhibit signal output terminal 753 of gate 746 also has a low potential which constitutes an upper and lower voltage breaker closing inhibit signal.

Gate 755 constitutes the master voltage gate. Gate 755 receives the output voltage of gate 746 at input terminal 756. Gate 755 receives the output voltage of voltage difference comparator 28 at input terminal 757. When the potentials at input terminals 756 and 757 are both high, the voltage at output terminal 758 is also high. When the voltage at input terminal 756 is low, which constitutes the upper and lower breaker closing inhibit signal; or when the voltage at input terminal 757 is low, which constitutes a voltage difference breaker closing inhibit signal, output terminal 758 has a low potential. The low potential of output terminal 758 constitutes a master breaker closing inhibit signal. The voltage at output terminal 758 is also supplied to master breaker control line 778.

The output potential from master voltage gate 755 is supplied to lead 759 and to base 763 of transistor 762. When the output potential of gate 755 is high, transistor 762 conducts; allowing current to flow through coil 767 and closing the pair of relay contacts 769. When the output potential of gate 755 is low, transistor 762 is held OFF and contacts 769 are open.

Relay 760 is connectable at contact points 770, 771, 772 and 773 to external monitoring equipment. Relay 760 is employed to provide electrical isolation from other portions of the synchronizing check relay.

Dead bus comparator 48 receives the first direct current potential at inverting terminal 580 of operational amplifier 579. When the first direct current potential exceeds a dead bus reference potential, received from potentiometer 592, output terminal 584 of operational amplifier 579 is held at a low or negative voltage allowing light-emitting diode 605 to light and keeping capacitor 616 discharged through diode 610 and resistor 608. When the first direct current potential is less than the dead bus reference potential, output terminal 584 has a relatively high or positive voltage which blocks light-emitting diode 605, thereby holding light-emitting diode 605 off. The high potential also blocks diode 610 and passes a current through resistor 607 to capacitor 616 causing capacitor 616 to charge. After capacitor 616 has charged a selected amount usually taking a second, a high voltage is supplied to inverter 651. When the first direct current potential returns to a voltage less than the voltage supplied through potentiometer 592, capacitor 616 is quickly discharged through diode 610 and resistor 608. It should be appreciated that resistor 607 is a 300 kilohm resistor and 608 is a 10 kilohm resistor. Capacitor 616 takes a relatively long time to charge and a relatively short time to discharge. Timer 606 prevents triggering of circuitry due to intermittent voltage fluctuation on the first A.C. line. The dead bus reference potential is typically set to 30 to 40 volts as seen from the input.

The dead line comparator 49 works in an identical fashion to the dead bus comparator. The dead line comparator 49 produces a high output at terminal 664 when the second direct current potential is less than a selected potential.

The dead line-dead bus logic 50 ensures that a master line override signal at line 668 is only produced when the line is dead and the bus is hot. When the line is dead and the bus is hot, a low voltage is supplied to inverter 651 which in turn supplies a high voltage to input terminal 654 of gate 652. When the line is dead, a high potential is supplied to input terminal 656. Thus, gate 652 only produces a bus override signal when the line is dead and the bus is hot. Similarly, when the bus is dead and the line is hot, gate 658 produces a high potential, which is a bus override signal.

Dead line-dead bus logic 50 also controls the supply of breaker override signals to power relay logic circuit 48. Relay 696 can be closed by completing the circuit between points 710 and 711. When relay 696 is closed, the output of gate 652 is supplied to lead 695. Relay 676 can also be closed by completing the circuit between points 691 and 692. When the relay 676 is closed, the output of gate 658 is supplied to lead 695. The operations of relay 676 and relay 696 are independent. Thus, either relay 676 or 696 may be open or closed separately, or simultaneously. Diodes 684 and 694 act as an OR gate to supply respective breaker override signals to lead 695. When the breaker override signal, which is a high voltage, is present at lead 695, diode 1076 also drives lead 778 high, causing a pair of high inputs to be present at input terminals 1088 and 1090 of the AND gate 1086.

Zero crossing gate 51 is a portion of phase sensor 33. Zero crossing gate 51 receives the first stepped down alternating current potential 1202 at diode 818. The second inverted stepped down alternating current potential 1206 is received at diode 822. The second stepped down potential is inverted by transformer 114. A high potential is present at base 832 of transistor 830 when the first input A.C. potential is high, or positive, and the second input A.C. potential is negative. Any other combination of input yields a low voltage at base 832. When base 832 is high, transistor 830 conducts, holding the input terminals of NAND gates 838 and 842 low. When the input to NAND gates 838 and 842 is low, output terminal 845 is driven high. Thus, output 845 is high when the first input A.C. potential is positive and the second A.C. potential is negative. For any other input combination the output potential at terminal 845 is low. Thus, a rectangular wave signal 1208 is produced at output terminal 845. The rectangular wave 1208 has an upper voltage having a time duration proportional to the magnitude of the phase difference between the first input alternating current potential and the second input alternating current potential zero crossing time. The rectangular wave output is low at all other times. A pair of taps 828 and 829 are connectable to a suitable measuring device to detect the output of diodes 818 and 822.

Figure 2:
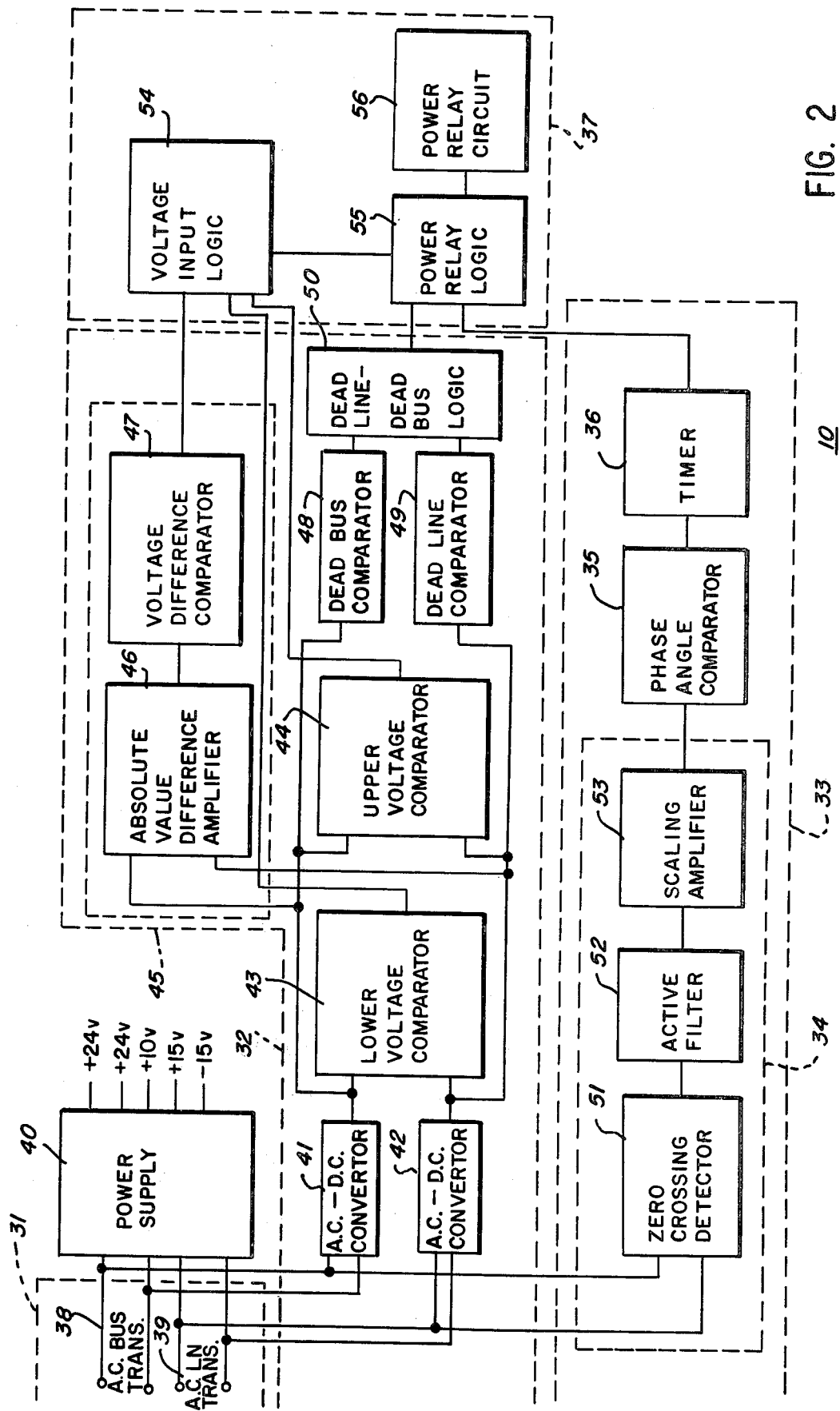
FIG. 2 is a block diagram of the synchronizing check relay of FIG. 1.
Figure 3A:
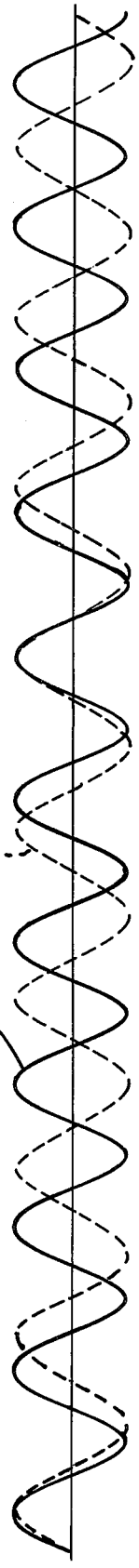
FIG. 3A-3D is a graph of input waveforms from the electrical transmission system and a rectangular wave generated by a phase sensor of the synchronizing check relay of FIG. 2.
Figure 3B:
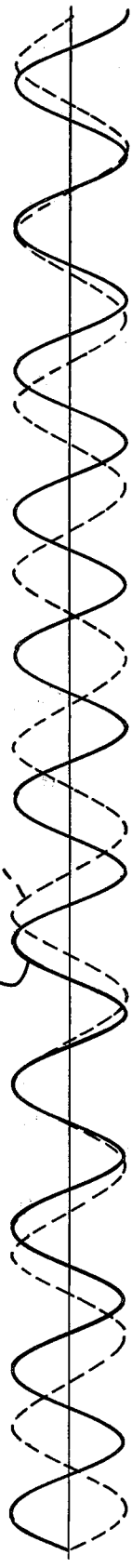
Figure 3C:
Figure 3D:
Figure 4:
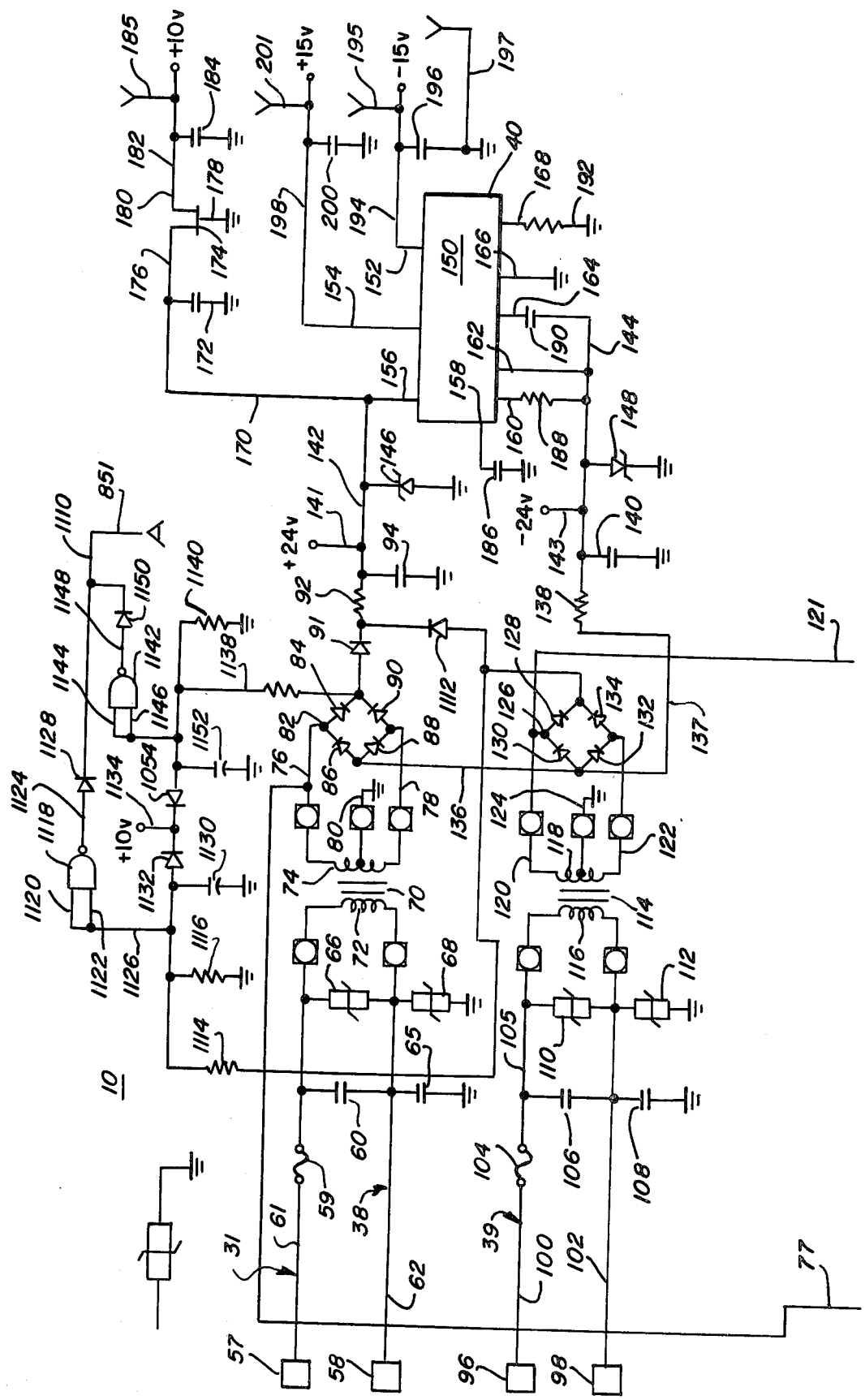
FIG. 4 is a schematic diagram of a pair of input circuits and a power supply of the synchronizing check relay of FIG. 1.
Figure 5:
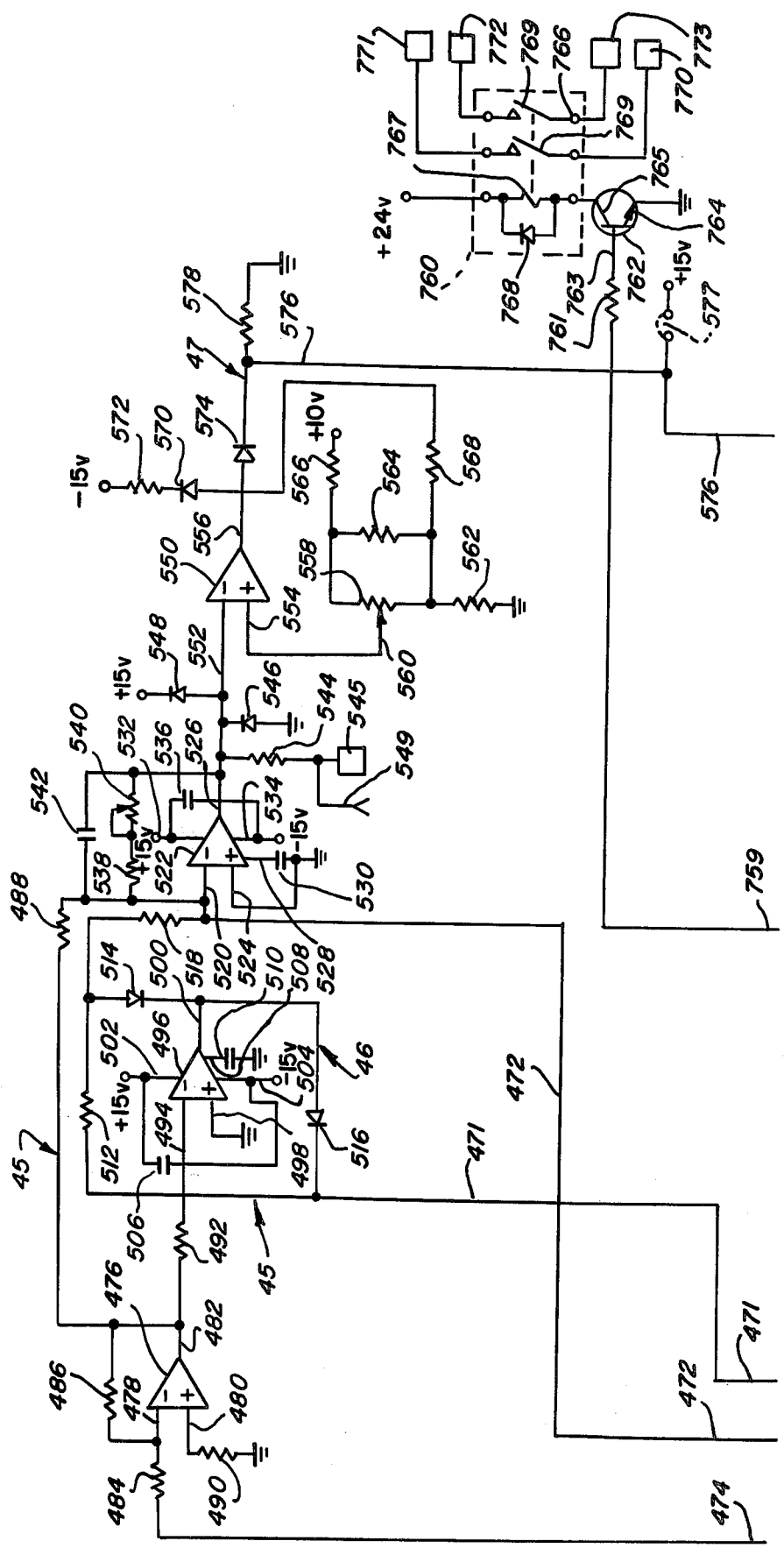
FIG. 5 is a schematic diagram of a portion of the synchronizing check relay of FIG. 1 including a portion of an absolute value sensor.
Figure 6:
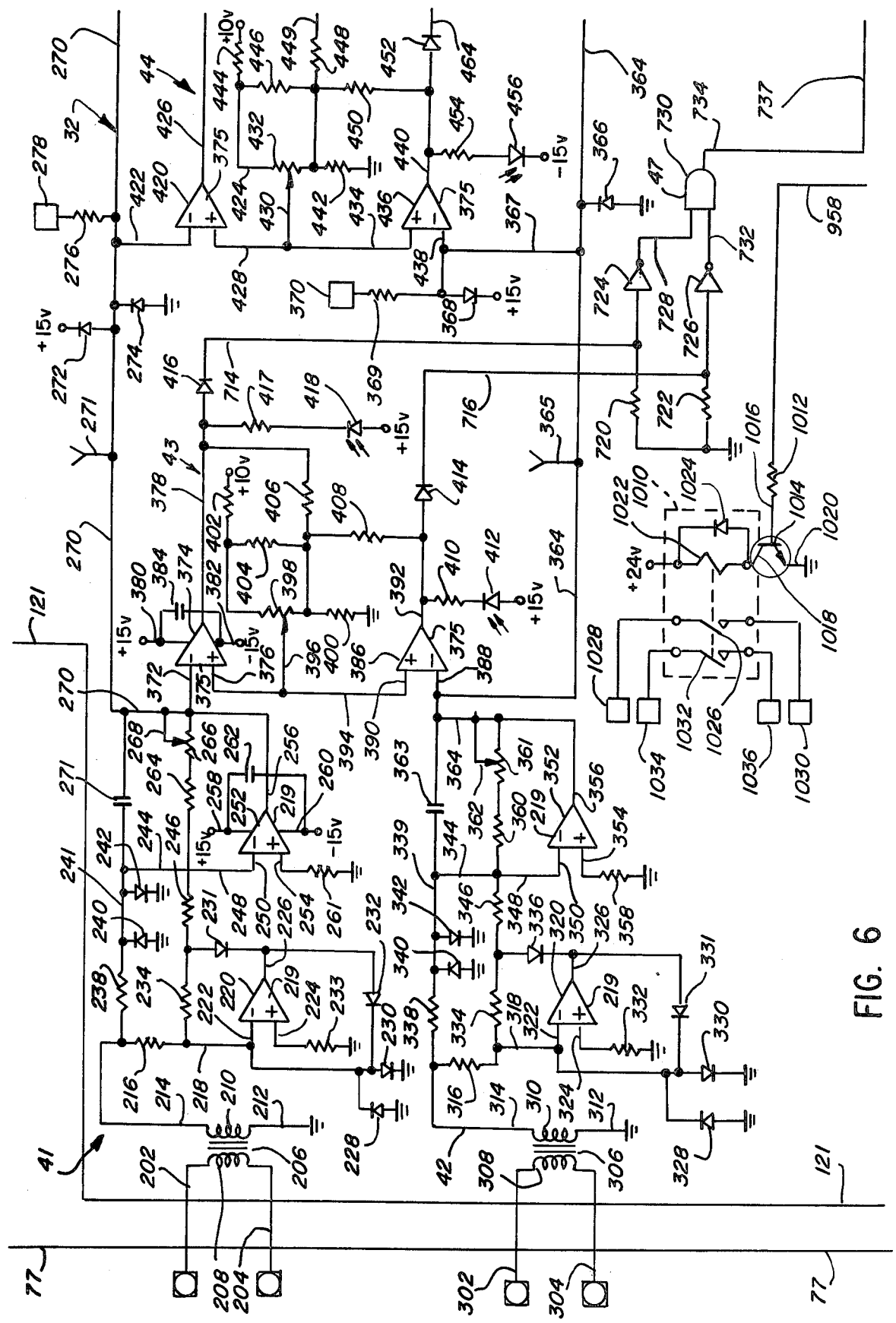
FIG. 6 is a schematic diagram of a portion of a voltage sensor of synchronizing check relay of FIG. 1.
Figure 7:
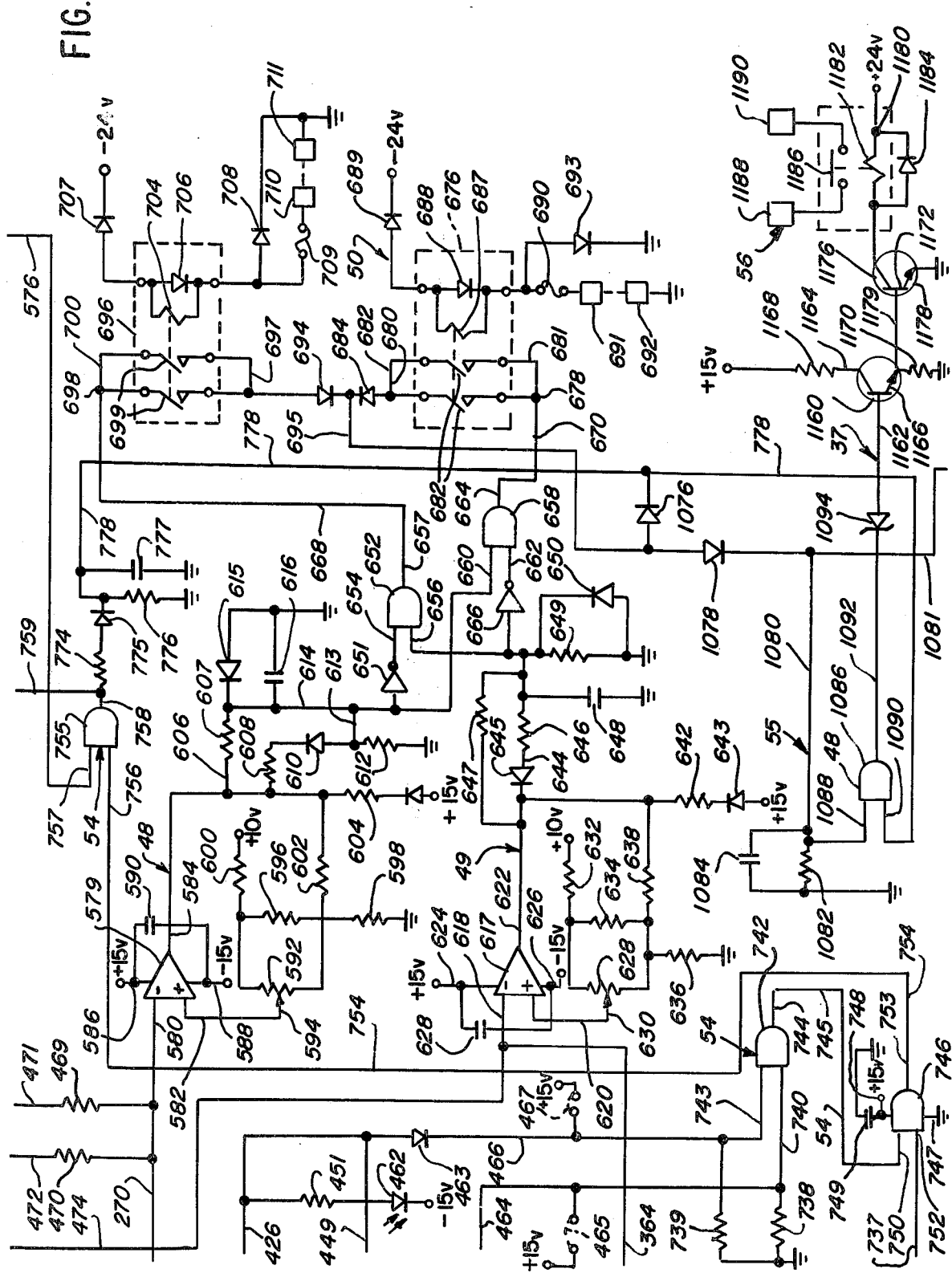
FIG. 7 is a schematic diagram of another portion of the voltage sensor of synchronizing check relay of FIG. 1.
Figure 8:
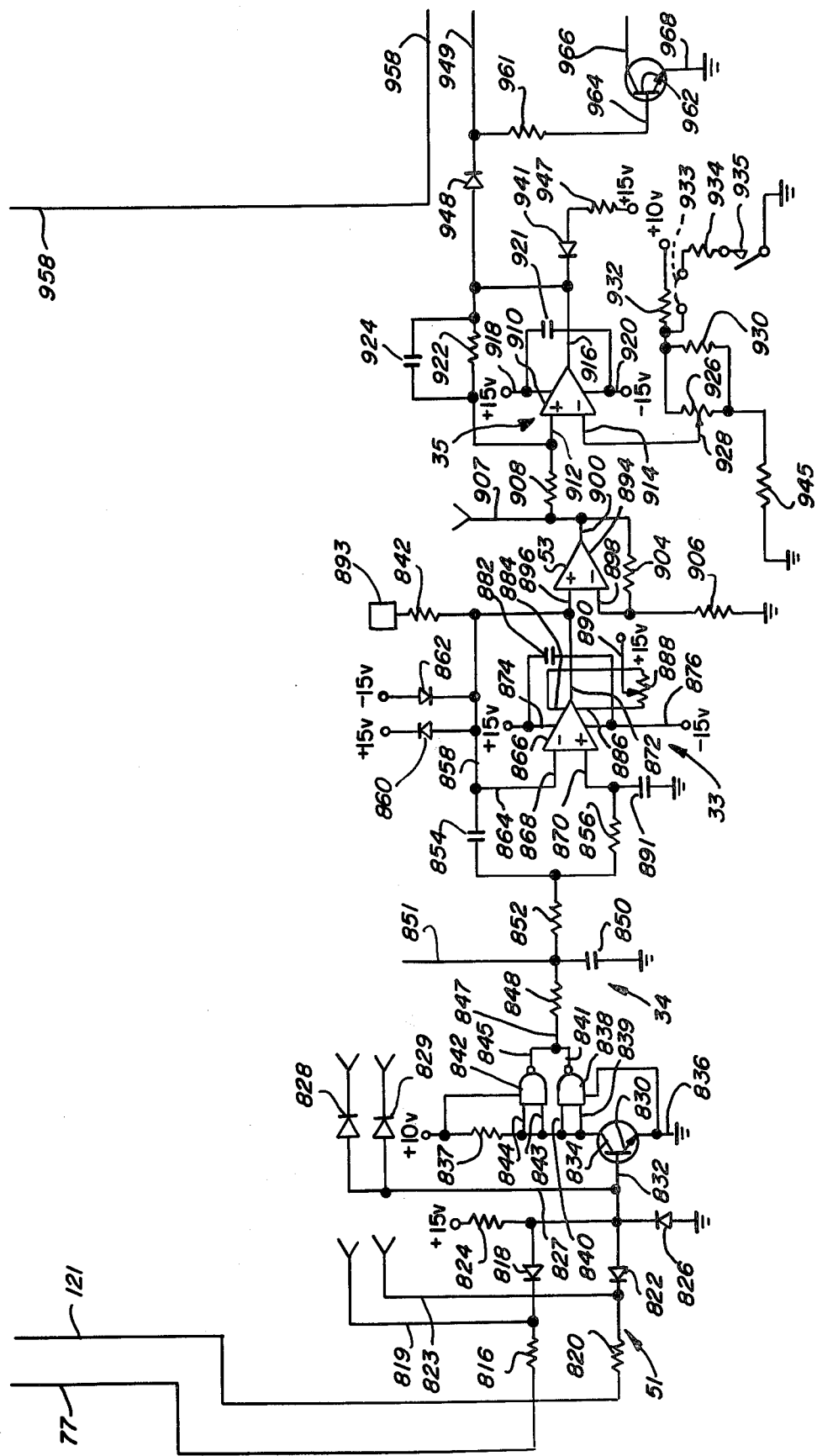
FIG. 8 is a schematic diagram of a portion of a phase sensor of synchronizing check relay of FIG. 1.
Figure 9:
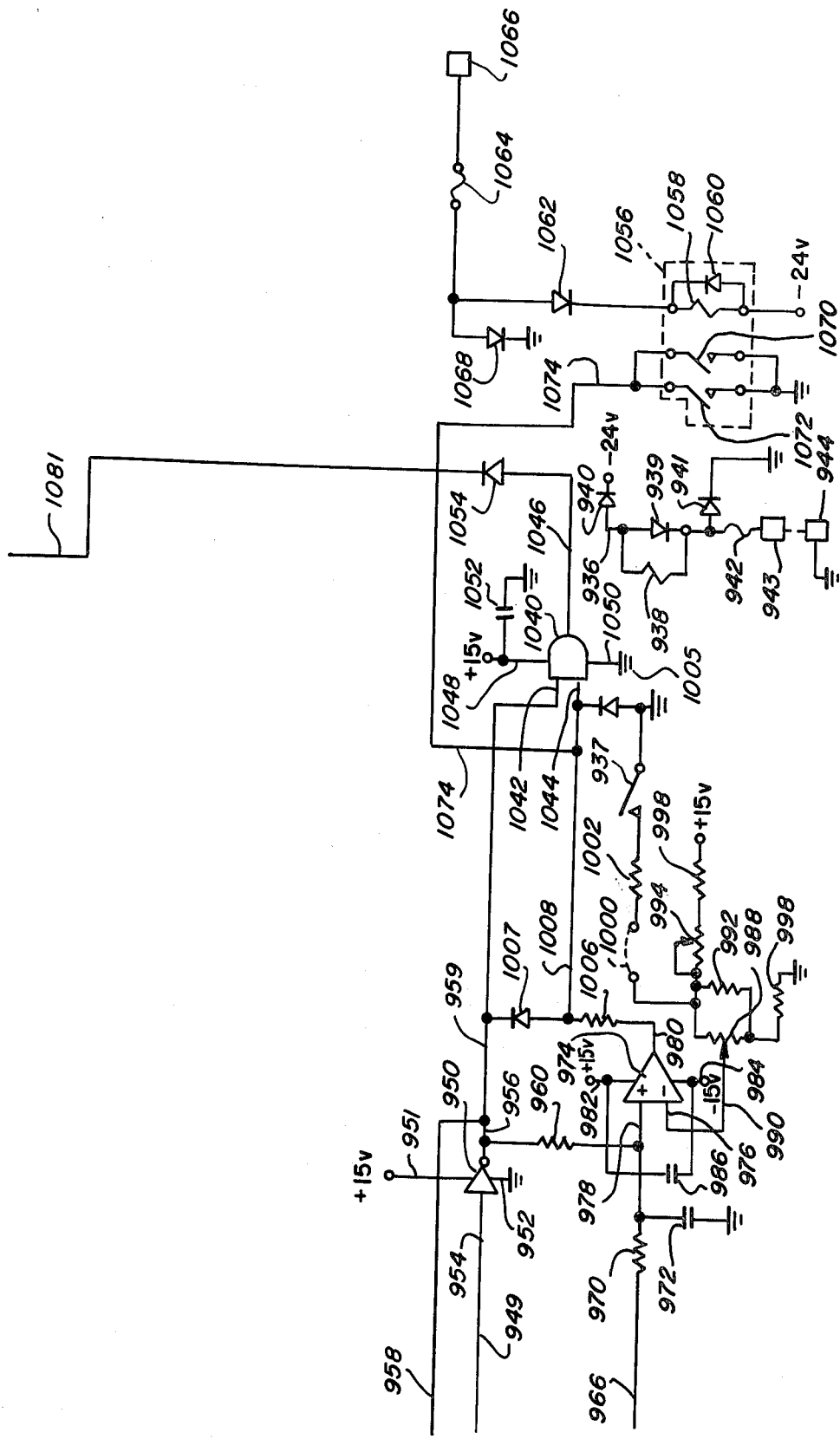
FIG. 9 is a schematic diagram of a portion of the circuitry of the synchronizing check relay of FIG. 1 including a timer.

Resistor 848 and capacitor 850 filter the rectangular wave from output terminal 845. The rectangular wave 1208 is supplied to active filter 52 at resistor 852. Active filter 52 has a third order Butterworth function, which is well-known in the art. The active filter having the third order Butterworth function simulates an inductance and produces an output potential 1210 at lead 872 having an instantaneous amplitude directly proportional to the magnitude of the phase difference between the first alternating current input signal and the second alternating current input signal. The output of operational amplifier 866 is at a minimum when the phase difference between the first alternating current voltage and the second alternating current voltage is zero. The output of amplifier 866 is at a maximum when the phase difference between the first alternating current potential and the second alternating current potential is positive or negative 180°. This may best be seen in FIG. 2 of the drawings. Diodes 860 and 862 provide protection to remote sensing port 893. A suitable electrical measuring instrument can be connected to remote sensing port 893 to receive a potential proportional to the output potential of operational amplifier 866.

Scaling amplifier 53 amplifies the output of operational amplifier 866, which is then supplied to resistor 908. The output of operational amplifier 894 may be observed at tap 907. The output of operational amplifier 806 is a substantially triangular wave when the frequency of the first alternating current voltage is constant and the frequency of the second alternating current voltage is constant but not equal to frequency of the first alternating current voltage. However, the present invention is most useful when the frequency of the first alternating current voltage and the frequency of the second alternating current voltage are equal, as commonly found at network breakers where the phase difference is constant. When the phase difference is constant, the output potential of operational amplifier 894 is constant.

The output of operational amplifier terminal 894 is supplied to operational amplifier 910 of the phase difference sensor 35. A phase reference potential is supplied to input terminal 914 of operational amplifier 910. The phase reference potential is received from potentiometer 926. Resistor 932 receives the positive extremely stable 10-volt voltage potential from lead 182. Resistor 930, a 5.62 kilohm resistor, is connected in parallel with 50 kilohm potentiometer 926, so that potentiometer 926 simulates a highly accurate 5 kilohm potentiometer. Resistor 945 is a low resistance resistor connected to ground. In addition, a jumper 933 may be selectively connected between resistor 932 and resistor 934. When jumper 933 is connected, the range of phase reference potential available at tap 928 may be quickly changed by connecting terminals 943 and 944 together to close relay contact 935. Thus, the reference potential supplied to operational amplifier 910 may be quickly and easily changed from one range to another.

The output of amplifier 894 is supplied to non-inverting terminal 912 of operational amplifier 910. Operational amplifier 910 provides a positive output when the output of the scaling amplifier 894 exceeds the phase reference potential. When the output terminal 916 of operational amplifier 910 is held positive, light-emitting diode 926 is OFF and diode 948 conducts. When the potential from operational amplifier 894 is less than the reference potential from tap 928 operational amplifier 910 produces a negative output, lighting light-emitting diode 926 and holding diode 948 low.

The low potential from diode 948, indicating that the phase difference is within bounds, is supplied to resistor 961 of timer 16 holding transistor 962 OFF. The low potential at inverter 950 is inverted and a high potential is supplied to capacitor 972. Capacitor 972 begins charging. The potential from capacitor 972 is supplied to input terminal 978 of operational amplifier 974.

When the output potential from diode 948 is high, indicating that the phase difference exceeds the limit set by potentiometer 926, transistor 962 is held ON and discharges capacitor 972. Inverter 950 is also held low, thereby cutting off potential to input terminal 978.

Input terminal 976 receives a timer reference potential from potentiometer 988. Potentiometer 988 is connected to variable resistor 944 and fixed resistor 996 which is connected to receive a positive 15-volt potential. Resistor 922 and potentiometer 988 simulate a highly accurate 5 kilohm potentiometer. A jumper 1000 may be connected between resistor 994 and resistor 1002. When jumper 1000 is connected, contact 937 can be closed to vary the range of the timer reference potential.

When transistor 962 is switched OFF, capacitor 972 begins charging. Capacitor 972 charges through resistor 960. Capacitor 972 takes a selected amount of time to charge up to a potential equal to the timer reference potential. When the potential of capacitor 972 exceeds the timer reference potential, a positive output is supplied at output terminal 980 thereby supplying a high potential or time signal to diode 1007 and to lead 1008. The time duration from the time the phase difference signal is received until the time signal is produced is controlled by potentiometer 988, variable resistor 944 and contact 937. Thus, the time duration generated by the timer 16 is completely independent of the phase difference comparator reference level supplied to potentiometer 928. This independence allows for separate adjustment of the phase sensor and the timer.

When the phase difference is within bounds, inverter 950 produces a high potential output, which switches transistor 1014 ON, causing relay 1010 to close. When relay 1010 is closed, the output terminals 1028, 1030, 1034 and 1036 can supply output response to equipment to which they can be connected. When the phase difference between the input potentials exceeds the phase difference reference level, inverter 950 produces a low voltage, switching OFF transistor 1014 and allowing relay 1010 to open. Thus, relay 1010 gives an output indication of the output condition of operational amplifier 910.

The voltage generated by inverter 950 is also supplied to input terminal 1044 of gate 1040. The output potential of comparator 974 is supplied to input terminal EEE of gate 1040. When the potentials of both terminals EEE and 1044 are high, a high potential is supplied to diode 1054. The high potential at diode 1054 is supplied to input terminal 1088 of gate 1086. Master control gate 1086 produces a high output potential when a breaker override signal 1090 is held off indicating that the voltages are within bounds or is present or when the voltages and phase difference are within the preselected limits and the timer is producing the time signal. In all other cases, the output of master control gate 1086 has a low potential.

Voltage lockout sensor 1110 receives the stepped-down D.C. voltage from the full wave rectifier bridges 82 and 126. Gate 1118 receives the potential from rectifier bridge 126. When the output potential from rectifier bridge 126 falls to approximately one-half its normal voltage, gate 1118 produces a high voltage output which produces a high potential at lead 851. When the output potential of bridge 82 falls to one-half its normal level, gate 1142 produces a high voltage output, which is supplied to lead 851. When lead 851 has the high voltage present, in this case approximately 10 volts, the high voltage drives the output potential of operational amplifier 910 positive, thereby preventing input terminal 1044 of gate 1040 from receiving a high voltage, and preventing timer 16 from being switched ON. Voltage lockout circuit 110 is particularly useful in synchronizing check relays which do not have upper or lower voltage comparators; or dead bus or dead line comparators.

Relay 1056 is employed as a sync check inhibit circuit. When relay 1056 is open, the synchronizing check relay 10 operates normally. When relay 1056 is closed, the synchronizing check relay 10 is partially disabled, in that input terminal EEE of gate 1040 is held at ground, thereby preventing the timer 16 from triggering gate 1086 and closing the circuit breaker.

When the potential at output terminal 1092 of gate 1086 goes high, Zener diode 1094 receives a high potential and avalanches. Transistor 1160 switches ON thereby switching transistor 1176 ON. When transistor 1176 switches ON, a current flows through coil 1182 closing contact 1186. Contacts 1188 and 1190 are connected to the circuit breaker. When contact 1186 closes, the circuit breaker receives a closing signal. Zener diode 1094 prevents closing of relay 1180 should the voltage on lead 148, normally 15 volts D.C., drop out of regulation. Zener diode 1094 blocks breaker closing should regulator 150 fail or should a component cause excessive current consumption.

Thus, the breaker closing signal is supplied when either a bus or a line is dead; or when the phase difference is within the preselected limits. The phase sensor and timer can be disabled by closure of relay 1056, thereby holding input terminal 1042 and output terminal 1046 of gate 1040 at low potential. Therefore, in summary, the first and second alternating current input potentials are received at input circuits 18 and 19 and stepped down. The power supply 40 receives both stepped down potentials and rectifies them through the full wave rectifier bridges 82 and 126. Integrated circuit voltage regulators 150 and 174 provide a plurality of highly stable potentials to other portions of the circuit.

The first and second stepped down alternating current potentials are also received at alternating current to direct current converters 41 and 42. Alternating current to direct current converters 41 and 42 produce the first and second direct current potentials which are respectively proportional to the first and second alternating current input potentials.

The lower voltage comparator 43 receives both direct current potentials and produces a lower breaker closing inhibit signal when either of the direct current potentials drops below the preselected lower potential reference limit. The upper voltage comparator 44 also receives the first and second direct current potentials and produces the upper breaker closing inhibit signal when either of the direct current voltages exceeds the upper voltage reference limit. The absolute value difference amplifier 46 receives both direct current potentials and produces a voltage difference signal proportional to the absolute value of the difference between the values of the first and second direct current voltages. The voltage difference signal is supplied to the voltage difference comparator 47. The voltage difference comparator 47 produces the voltage difference breaker closing inhibit signal when the voltage difference potential exceeds the voltage difference reference potential.

Each of the breaker closing inhibit signals is supplied to the voltage output logic circuit 54. The voltage output logic circuit 54 produces a master breaker closing inhibit signal when it receives any other breaker closing inhibit signal. The master breaker closing inhibit signal is supplied to the power relay logic 55. The master breaker closing inhibit signal is also supplied to voltage indicating relay 760. When the master breaker closing inhibit signal is present, relay 760 is open. When the master breaker closing inhibit signal is absent, relay 760 is closed.

The dead bus comparator produces a dead bus breaker override signal when the first direct current voltage is low and the second direct current voltage is high. The dead line comparator produces a dead line breaker override signal when the first direct current potential is high and the second direct current potential is low. Each of the breaker override signals can be selectively supplied through the dead bus-dead line logic system to the power relay logic.

The zero crossing detector receives the stepped down first alternating current voltage and the stepped down inverted second alternating current voltage. Zero crossing detector 51 produces a rectangular wave having its high potential output when both alternating current potentials, which it receives, are positive. The rectangular wave has a low potential at all other times. The rectangular wave is fed to the active filter 52. Active filter 52 produces an output potential having an instantaneous amplitude proportional to the phase difference between the first and second input alternating current voltages. The scaling amplifier 53 increases the amplitude of the output potential of active filter 52.

Phase angle comparator 35 receives the output of scaling amplifier 52 and produces the selected phase angle comparator output when the output potential of scaling amplifier 52 is less than the phase reference potential.

The phase angle selected comparator output controls relay 1010. Relay 1010 is closed when the phase angle selected output is generated. Relay 1010 is open when the selected phase angle comparator is not generated. The selected phase angle comparator output is inverted and supplied to gate 1040.

The selected phase angle comparator output also controls timer 36, allowing the timing capacitor to charge when timer 36 receives the selected comparator output. When the timing capacitor is charged to a potential equal to the timer reference potential, operational amplifier 974 produces the time signal output. The time signal output is supplied to gate 1040.

Gate 1040 produces a high potential, when it receives a high potential from inverter 950 and a high potential from the timer 36. Gate 1040 produces a low potential output for all other input conditions. Master control gate 1086, which is part of the power relay logic, produces a high potential when it receives high potentials at both of its input terminals 1088 and 1090 due to either of the breaker override signal or due to the absence of the breaker closing inhibit signal from the voltage output logic and the presence of the high potential from gate 1040. When output terminal 1092 of gate 1086 goes high, Zener diode 1094 is avalanched, switching ON transistors 1160 and 1162 and closing breaker control relay 1186, thereby effecting closure of the circuit breaker to which relay 1186 is connected.

It may be appreciated that the instant invention has a number of features which make it highly useful in the environment in which it operates. The operation of the timer and the phase sensor are independent, in that the setting of the phase sensor triggering level and the timer triggering level are completely independent. Thus, circuit breaker closing is only effected at the user selected phase angle difference and time duration. A number of interrogation ports are provided, so that suitable measuring instruments may be connected to measure the output of the absolute value difference amplifier, the first alternating current to direct current converter, the second alternating current to direct current converter, and the active filter. The ports allow continuous monitoring of circuit operation. In addition, the port is connected to diode pairs so that voltage changes at the ports do not damage synchronizer check relay 10. The voltage and phase sensor relays also give an output indication as to the status of the voltage input logic and the phase sensor. The light-emitting diodes provide a visual indication of the status of the synchronizing check relay. Lit diodes indicate normal electrical conditions. Extinguished diodes indicate abnormal electrical conditions.

The entire circuit is substantially independent of fluctuation over a temperature range between −40° C. and +80° C. The supply reference voltage which employed by the lower voltage comparator 43, the upper voltage comparator 44, the voltage difference comparator 47, the dead bus comparator 48, the dead line comparator 49, and the phase sensor 33, is provided by hybrid integrated circuit voltage regulator 174 which is extremely stable despite input voltage, current, and temperature fluctuations. Lower and upper voltage comparators 43 and 44, voltage difference comparator 47, dead bus comparator 48, dead line comparator 49, phase sensor 33 and timer 36 each have a 50 kilohm potentiometer connected in parallel with a 5.62 kilohm resistor. The 50 kilohm potentiometers provide adjustable reference potentials to each of the enumerated circuits. The adjustable reference potentials may be changed in extremely small increments since the paralleled 50 kilohm potentiometers and 5.62 kilohm resistors simulate very accurate 5 kilohm potentiometers.

The phase sensor and timer function independently of input voltage. The voltage sensor functions independently from the phase conditions and the timer. The upper voltage comparator, the lower voltage comparator, the absolute value sensor, the dead bus comparator and the dead line comparator function independently from one another.

Timer 36 can be selectively disabled by external control of sync check relay 1056. The synchronizing check relay 10 may also be operated without employing lower voltage comparator 43, upper voltage comparator 44 or absolute value difference detector 46. In addition, the circuit can also be operated without dead bus comparator 48 and dead line comparator 49 so that only the basic phase angle and timer function is employed.

Thus, the present invention provides a synchronizing check relay which senses both voltage and phase of two alternating current potentials and controls closing of a circuit breaker in response to the alternating current voltages and phases.

Although a specific embodiment of the herein disclosed invention has been described in detail, it is readily apparent that those skilled in the art may make various modifications and changes in the present invention without departing from the spirit and scope of the present invention. Therefore, the present invention is limited only by the appended claims.

What is claimed is:

1. In an alternating current electrical transmission system having a pair of lines connected to a circuit breaker, a synchronizing check relay comprising: input means adapted for connection to said pair of lines adjacent to said circuit breaker, said input means being adapted to detect a first electrical condition on one of said lines and a second electrical condition on the other of said lines; means for generating a phase difference signal connected to said input means, said means for generating a phase difference signal generating a phase difference signal having an amplitude proportional to a phase difference between a phase of the first electrical condition and a phase of the second electrical condition;

a phase angle comparator connected to the means for generating the phase difference signal, said phase angle comparator receiving said phase difference signal, said phase angle comparator providing a selected phase angle comparator output when said phase difference signal is at a preselected condition; a timer connected to said phase angle comparator, said timer receiving said selected phase angle comparator output, said timer providing a time signal a selected time interval after receiving said selected phase angle comparator output, said selected time interval being independent of said preselected condition of said phase angle comparator; an output control circuit connected to said phase angle comparator to receive said phase angle comparator output, said output control circuit being connected to said timer to receive said time signal, said output control circuit being connected to the circuit breaker, said output control circuit providing a control signal to said circuit breaker when said phase angle comparator produces said selected phase angle comparator output and said timer produces said time signal; and a voltage sensor connected to said input means, said voltage sensor being adapted to receive a voltage of one of said electrical conditions, said voltage sensor being connected to said output control circuit, said voltage sensor inhibiting said output control circuit from providing said control signal when said voltage of said electrical condition is outside a selected voltage condition; said voltage sensor including an alternating current to direct current converter connected to said input means, said alternating current to direct current converter producing a direct current potential proportional to a potential of one of the electrical conditions detected by the input means; said voltage sensor including a second alternating current to direct current converter connected to said input means, said second alternating current to direct current converter producing a second direct current potential proportional to a potential of the other of the electrical conditions detected by the input means; and said voltage sensor including an upper voltage comparator connected to said first-mentioned alternating current to direct current converter to receive said first-mentioned direct current potential at a first operational amplifier, a second operational amplifier connected to said second alternating current to direct current converter to receive the second direct current potential; a potentiometer connected to each of said operational amplifiers, said potentiometer providing an upper reference voltage to said first and second operational amplifiers, each said operational amplifier producing an upper breaker closing inhibit signal when its respective direct current potential is greater than the upper reference voltage.

2. In an alternating current electrical transmission system having a pair of lines connected to a circuit breaker, a synchronizing check relay comprising: input means adapted for connection to said pair of lines adjacent to said circuit breaker, said input means being adapted to detect a first electrical condition on one of said lines and a second electrical condition on the other of said lines; means for generating a phase difference signal connected to said input means, said means for generating a phase difference signal generating a phase difference signal having an amplitude proportional to a phase difference between a phase of the first electrical condition and a phase of the second electrical condition; a phase angle comparator connected to the means for generating the phase difference signal, said phase angle comparator receiving said phase difference signal, said phase angle comparator providing a selected phase angle comparator output when said phase difference signal is at a preselected condition; a timer connected to said phase angle comparator, said timer receiving said selected phase angle comparator output, said timer providing a time signal a selected time interval after receiving said selected phase angle comparator output, said selected time interval being independent of said preselected condition of said phase angle comparator; an output control circuit connected to said phase angle comparator to receive said phase angle comparator output, said output control circuit being connected to said timer to receive said time signal, said output control circuit being connected to the circuit breaker, said output control circuit providing a control signal to said circuit breaker when said phase angle comparator produces said selected phase angle comparator output and said timer produces said time signal; and a voltage sensor connected to said input means, said voltage sensor being adapted to receive a voltage of one of said electrical conditions, said voltage sensor being connected to said output control circuit, said voltage sensor inhibiting said output control circuit from providing said control signal when said voltage of said electrical condition is outside a selected voltage condition; said voltage sensor including an alternating current to direct current converter connected to said input means, said alternating current to direct current converter producing a direct current potential proportional to a potential of one of the electrical conditions detected by the input means; said voltage sensor including a second alternating current to direct current converter connected to said input means, said second alternating current to direct current converter producing a second direct current potential proportional to a potential of the other of the electrical conditions detected by the input means; and said voltage sensor including a lower voltage comparator connected to said first-mentioned alternating current to direct current converter to receive said first-mentioned direct current potential at a first operational amplifier; a second operational amplifier connected to said second alternating current to direct current converter to receive the second direct current potential; a potentiometer connected to each of said operational amplifiers, said potentiometer providing a lower reference voltage to said first and second operational amplifiers, each said operational amplifier producing a lower breaker closing inhibit signal when its respective direct current potential is less than the lower reference voltage.

3. In an alternating current electrical transmission system having a pair of lines connected to a circuit breaker, a synchronizing check relay comprising: input means adapted for connection to said pair of lines adjacent to said circuit breaker, said input means being adapted to detect a first electrical condition on one of said lines and a second electrical condition on the other of said lines; means for generating a phase difference signal connected to said input means, said means for generating a phase difference signal generating a phase difference signal having an amplitude proportional to a phase difference between a phase of the first electrical condition and a phase of the second electrical condition; a phase angle comparator connected to the means for generating the phase difference signal, said phase angle comparator receiving said phase difference signal, said phase angle comparator providing a selected phase angle comparator output when said phase difference signal is at a preselected condition; a timer connected to said phase angle comparator, said timer receiving said selected phase angle comparator output, said timer providing a time signal a selected time interval after receiving said selected phase angle comparator output, said selected time interval being independant of said preselected condition of said phase angle comparator; an output control circuit connected to said phase angle comparator to receive said phase angle comparator output, said output control circuit being connected to said timer to receive said time signal, said output control circuit being connected to the circuit breaker, said output control circuit providing a control signal to said circuit breaker when said phase angle comparator produces said selected phase angle comparator output and said timer produces said time signal; and a voltage sensor connected to said input means, said voltage sensor being adapted to receive a voltage of one of said electrical conditions, said voltage sensor being connected to said output control circuit, said voltage sensor inhibiting said output control circuit from providing said control signal when said voltage of said electrical condition is outside a selected voltage condition, said voltage sensor including an alternating current to direct current converter connected to said input means, said alternating current to direct current converter producing a direct current potential proportional to a potential of one of the electrical conditions detected by the input means; said voltage sensor including a second alternating current to direct current converter connected to said input means, said second alternating current to direct current converter producing a second direct current potential proportional to a potential of the other of the electrical conditions detected by the input means; and said voltage sensor including an absolute value difference amplifier connected to said first-mentioned alternating current to direct current converter to receive said first-mentioned direct current potential, said absolute value difference amplifier being connected to said second alternating current to direct current converter to receive said second direct current potential, said absolute value difference amplifier producing an absolute value output signal proportional to an absolute difference between said first-mentioned direct current potential and said second direct current potential.

4. In an alternating current electrical transmission system having a pair of lines connected to a circuit breaker, a synchronizing check relay as defined in claim 3, wherein said voltage sensor includes an absolute value comparator connected to said absolute value difference amplifier, said absolute value comparator receiving said absolute value output from said absolute value difference amplifier at an operational amplifier, a reference connected to said operational amplifier, said reference producing a reference potential, said operational amplifier producing a breaker closing inhibit signal when said absolute value output exceeds said reference potential.

5. In an alternating current electrical transmission system having a pair of lines connected to a circuit breaker, a synchronizing check relay comprising: input means adapted for connection to said pair of lines adjacent to said circuit breaker, said input means being adapted to detect a first electrical condition on one of said lines and a second electrical condition on the other of said lines; means for generating a phase difference signal connected to said input means, said means for generating a phase difference signal generating a phase difference signal having an amplitude proportional to a phase difference between a phase of the first electrical condition and a phase of the second electrical condition; a phase angle comparator connected to the means for generating the phase difference signal, said phase angle comparator receiving said phase difference signal, said phase angle comparator providing a selected phase angle comparator output when said phase difference signal is at a preselected condition; a timer connected to said phase angle comparator, said timer receiving said selected phase angle comparator output, said timer providing a time signal a selected time interval after receiving said selected phase angle comparator output, said selected time interval being independent of said preselected condition of said phase angle comparator; and an output control circuit, connected to said phase angle comparator to receive said phase angle comparator output, said output control circuit being connected to said timer to receive said time signal, said output control circuit being connected to the circuit breaker, said output control circuit providing a control signal to said circuit breaker when said phase angle comparator produces said selected phase angle comparator output and said timer produces said time signal; a first alternating current to direct current converter connected to said input means producing a first direct current potential directly proportional to a first root mean square potential of said first electrical condition; a second alternating current to direct current converter connected to said input means producing a second direct current potential proportional to a second root mean square potential of said second electrical condition; an absolute value difference detector connected to said first alternating current to direct current converter receiving said first direct current potential and a unity gain inverting operational amplifier, said unity gain inverting operational amplifier inverting said first direct current potential, a second operational amplifier being connected to receive said second direct current potential at an inverting terminal, said second operational amplifier having a unity gain feedback loop having a diode connected therewith, said second operational amplifier combining selected positive portions of said first and second direct current potentials, and a third operational amplifier connected to said first diode at an output terminal, said third operational amplifier also being connected to said output terminal of said first operational amplifier at said inverting terminal, said third operational amplifier having a variable resistor connected between its inverting terminal and its output terminal, said third operational amplifier producing a singal proportional to an absolute difference between said first direct current potential and said second direct current potential, said output of said absolute value difference amplifier being provided to an output line connected to other portions of said voltage sensor, and a tap connected to said output line to provide a terminal for an analog readout.

6. In an alternating current electrical transmission system having a pair of lines connected to a circuit breaker, a synchronizing check relay as defined in claim 5, including a voltage difference comparator connected to said output line of said absolute value difference detector, said voltage difference comparator having a voltage difference operational amplifier connected to said output line, a potentiometer connected to a non-inverting terminal of said voltage difference operational amplifier, a source of stable potential connected to said potentiometer, a resistor connected to said potentiometer in parallel with the highly regulated stable potential and also connected to an output terminal of the voltage difference operational amplifier, a potentiometer connected to said source of stable potential, said potentiometer providing a switching potential to said voltage difference operational amplifier and providing a hysteresis voltage to said noninverting terminal of said voltage difference operational amplifier through said potentiometer to provide a definite switching point for said voltage difference operational amplifier, said voltage difference operational amplifier providing a positive signal at said output terminal to inhibit breaker closing when said voltage difference exceeds said switching potential.

7. In an alternating current electrical transmission system having a pair of lines connected to a circuit breaker, a synchronizing check relay comprising: input means adapted for connection to said pair of lines connected to said circuit breaker, said input means being adapted to detect a first electrical condition on one of said lines and a second electrical condition on another of said lines; a phase sensor connected to said input means, said phase sensor producing a selected phase sensor output when a difference between a phase of said first electrical condition and a phase of said second electrical condition is at a preselected condition; a timer connected to said phase sensor, said timer receiving said selected phase sensor output, said timer producing a time signal a selected time interval after receiving said selected phase sensor output, said time interval being independent of said selected condition of said difference between said phases; an output control circuit, said output control circuit being connected to said timer, said output control circuit also connected to the circuit breaker, said output control circuit providing a control signal to said circuit breaker when said timer produces said time signal, said output control circuit is connected to said phase sensor, said output control circuit providing said control signal to said circuit breaker when said timer produces said time signal; and a voltage sensor connected to said input means, said voltage sensor being connected to said output control circuit, said voltage sensor controlling said output control circuit for a selected voltage of one of said electrical conditions, said voltage sensor including a first alternating current to direct current converter connected to said input means, said first alternating current to direct current converter producing a direct current potential proportional to a potential of the first electrical condition detected at said input means, and a second alternating current to direct current converter connected to said input means, said second alternating current to direct current converter producing a second direct current potential proportional to a potential of the second electrical condition detected at said input means, said voltage sensor including an upper voltage comparator connected to each of said alternating current to direct current converters, said upper voltage comparator producing an upper reference potential, said upper voltage comparator producing an upper breaker closing inhibit signal when either of said direct current signals received from each of said alternating current to direct current converters is above said upper reference potential, said breaker closing inhibit signal from said upper voltage comparator being supplied to control said output control circuit.

8. In an alternating current electrical transmission system having a pair of lines connected to a circuit breaker, a synchronizing check relay as defined in claim 7, wherein said upper voltage comparator includes a first operational amplifier connected to said first alternating current to direct current converter, a potentiometer connected to said first operational amplifier, a source of potential connected to said potentiometer, and a second operational amplifier connected to said second alternating current to direct current converter, said second operational amplifier being connected to said potentiometer, said potentiometer supplying said upper reference potential to each of said operational amplifier, each of said operational amplifiers producing said upper breaker closing inhibit signal when the respective direct current potential which it receives exceeds the upper reference potential supplied by the potentiometer.

9. In an alternating current electrical transmission system having a pair of lines connected to a circuit breaker, a synchronizing check relay as defined in claim 7, wherein said voltage sensor includes a lower voltage comparator connected to each of said alternating current to direct current converters, said lower voltage comparator producing a lower reference potential, said lower voltage comparator providing a lower breaker closing inhibit signal when either of said direct current potentials received from the alternating current to direct current converters is below the lower reference potential, said lower breaker closing inhibit signal being supplied to control said output control circuit.

10. In an alternating current electrical transmission system having a pair of lines connected to a circuit breaker, a synchronizing check relay as defined in claim 7, wherein said voltage sensor includes an absolute value difference detector connected to each of said alternating current to direct current converters, said absolute value difference detector producing an output directly proportional to a difference between said first direct current potential and said second direct current potential, a voltage difference comparator connected to said absolute value difference detector, said output of said absolute value difference detector being supplied to said voltage difference comparator, said voltage difference comparator producing a voltage difference reference potential, said voltage difference comparator providing a voltage difference breaker closing inhibit signal to said output control circuit when the difference between the absolute values of said first and second direct current voltages exceeds a voltage difference reference potential.

11. In an alternating current electrical transmission system having a pair of lines connected to a circuit breaker, a synchronizing check relay as defined in claim 10, wherein said voltage sensor includes a lower voltage comparator connected to each of said alternating current to direct current converters, said lower voltage comparator producing a lower reference potential, said lower voltage comparator producing a lower breaker closing inhibit signal when either of said direct current potentials received from each of said alternating current to direct current converters is below said lower selected reference potential, said lower breaker closing signal from said lower voltage comparator being supplied to said output control circuit.

12. In an alternating current electrical transmission system having a pair of lines connected to a circuit breaker, a synchronizing check relay comprising: input means adapted for connection to said pair of lines connected to said circuit breaker, said input means being adapted to detect a first electrical condition on one of said lines and a second electrical condition on another of said lines; a phase sensor connected to said input means, said phase sensor producing a selected phase sensor output when a difference between a phase of said first electrical condition and a phase of said second electrical condition is at a preselected condition; a timer connected to said phase sensor, said timer receiving said selected phase sensor output, said timer producing a time signal a selected time interval after receiving said selected phase sensor output, said time interval being independent of said selected condition of said difference between said phases; an output control circuit, said output control circuit being connected to said timer, said output control circuit also connected to the circuit breaker, said output control circuit providing a control signal to said circuit breaker when said timer produces said time signal, said output control circuit is connected to said phase sensor, said output control circuit providing said control signal to said circuit breaker when said timer produces said time signal; and a voltage sensor connected to said input means, said voltage sensor being connected to said output control circuit, said voltage sensor controlling said output control circuit for a selected voltage of one of said electrical conditions, said voltage sensor including a first alternating current to direct current converter connected to said input means, said first alternating current to direct current converter producing a direct current potential proportional to a potential of the first electrical condition detected at said input means, and a second alternating current to direct current converter connected to said input means, said second alternating current to direct current converter producing a second direct current potential proportional to a potential of the second electrical condition detected at said input means, said voltage sensor including a lower voltage comparator connected to each of said alternating current to direct current converters, said lower voltage comparator producing a lower reference potential, said lower voltage comparator providing a lower breaker closing inhibit signal when either of said direct current potentials received from said alternating current to direct current converters is below the lower reference potential, said lower breaker closing inhibit signal from said lower voltage comparator being supplied to control said output control circuit.

13. In an alternating current electrical transmission system having a pair of lines connected to a circuit breaker, a synchronizing check relay as defined in claim 12, wherein said lower voltage comparator includes a first operational amplifier connected to said first alternating current to direct current converter to receive said first direct current potential, a potentiometer connected to said first operational amplifier, a source of potential connected to said potentiometer, said potentiometer producing said lower reference potential, a second operational amplifier connected to said second alternating current to direct current converter, said second operational amplifier receiving said second direct current potential from said second alternating current to direct current converter, each of said operational amplifiers producing the lower breaker closing inhibit signal output when its respective direct current voltage exceeds said lower reference potential supplied by said potentiometer, said lower breaker closing inhibit signal from said lower voltage comparator being supplied to control said output control circuit.

14. In an alternating current electrical transmission system having a pair of lines connected to a circuit breaker, a synchronizing check relay comprising: input means adapted for connection to said pair of lines connected to said circuit breaker, said input means being adapted to detect a first electrical condition on one of said lines and a second electrical condition on another of said lines; a phase sensor connected to said input means, said phase sensor producing a selected phase sensor output when a difference between a phase of said first electrical condition and a phase of said second electrical condition is at a preselected condition; a timer connected to said phase sensor, said timer receiving said selected phase sensor output, said timer producing a time signal a selected time interval after receiving said selected phase sensor output, said time interval being independent of said selected condition of said difference between said phases; an output control circuit, said output control circuit being connected to said timer, said output control circuit also connected to the circuit breaker, said output control circuit providing a control signal to said circuit breaker when said timer produces said time signal, said output control circuit is connected to said phase sensor, said output control circuit providing said control signal to said circuit breaker when said timer produces said time signal, and a voltage sensor connected to said input means, said voltage sensor being connected to said output control circuit, said voltage sensor controlling said output control circuit for a selected voltage of one of said electrical conditions, said voltage sensor including a first alternating current to direct current converter connected to said input means, said first alternating current to direct current converter producing a direct current potential proportional to a potential of the first electrical condition detected at said input means, and a second alternating current to direct current converter connected to said input means, said second alternating current to direct current converter producing a second direct current potential proportional to a potential of the second electrical condition detected at said input means, said voltage sensor including an absolute value difference amplifier connected to each of said alternating current to direct current converters, said absolute value difference amplifier producing an output proportional to a difference between said first direct current potential and said second direct current potential.

15. In an alternating current electrical transmission system having a pair of lines connected to a circuit breaker, a synchronizing check relay as defined in claim 14, wherein said absolute value difference amplifier includes a first operational amplifier connected to said second alternating current to direct current converter to receive said second direct current signal, said first operational amplifier inverting said second direct current signal, a second operational amplifier connected to said first alternating current to direct current converter, said second operational amplifier having a diode connected between an inverting terminal and an output terminal, said second operational amplifier being a unity gain inverting amplifier, said second operational amplifier also being connected to receive input from said first operational amplifier, said second operational amplifier being active for selected portions of said first and second direct current potentials, and a third operational amplifier connected to said first and second operational amplifiers, said third operational amplifier providing amplification to a potential difference between an absolute value of said first direct current potential and said second direct current potential.

16. In an alternating current electrical transmission system having a pair of lines connected to a circuit breaker, a synchronizing check relay as defined in claim 15, wherein said voltage sensor includes a voltage difference comparator connected to said output terminal of said third operational amplifier of said absolute value difference amplifier, said voltage difference comparator being connected to said absolute value difference amplifier at an input terminal of a voltage difference operational amplifier, a potentiometer connected to said voltage difference operational amplifier, a source of potential connected to said potentiometer, said potentiometer generating a voltage difference reference potential, said voltage difference operational amplifier producing a voltage difference breaker closing inhibit signal when said potential from said third operational amplifier of said absolute value difference amplifier exceeds the voltage difference reference potential produced by said potentiometer, said voltage difference breaker closing inhibit signal being supplied to said output control circuit to control said output control circuit.

17. In an alternating current electrical transmission system having a pair of lines connected to a circuit breaker, a synchronizing check relay as defined in claim 16, wherein said voltage sensor includes a lower voltage comparator connected to each of said alternating current to direct current converters, said lower voltage comparator producing a lower voltage reference signal, said lower voltage comparator supplying a lower breaker closing inhibit signal to said output control circuit when said first direct current potential or said second direct current potential is less than the lower reference potential.

18. In an alternating current electrical transmission system having a pair of lines connected to a circuit breaker, a synchronizing check relay comprising: input means adapted for connection to said pair of lines connected to said circuit breaker, said input means being adapted to detect a first electrical condition on one of said lines and a second electrical condition on another of said lines; a phase sensor connected to said input means, said phase sensor producing a selected phase sensor output when a difference between a phase of said first electrical condition and a phase of said second electrical condition is at a preselected condition; a timer connected to said phase sensor, said timer receiving said selected phase senson output, said timer producing a time signal a selected time interval after receiving said selected phase sensor output, said time interval being independent of said selected condition of said difference between said phases; an output control circuit, said output control circuit being connected to said timer, said output control circuit also connected to the circuit breaker, said output control circuit providing a control signal to said circuit breaker when said timer produces said time signal, said output control circuit connected to said phase sensor, said output control circuit providing said control signal to said circuit breaker when said timer produces said time signal; and a voltage sensor connected to said input means, said voltage sensor being connected to said output control circuit, said voltage sensor controlling said output control circuit for a selected voltage of one of said electrical conditions; said phase sensor includes a logic gate, said logic gate being connected to said input means to receive a first signal proportional to said first electrical condition and to receive a second signal proportional to and reversed in polarity from said second electrical condition, said logic gate producing a substantially rectangular wave output having a high potential when said first signal and said second signal have a high potential and a low potential otherwise, said phase sensor includes an active filter connected to said logic gate to receive said rectangular wave, said active filter intergrating said substantially rectangular wave to produce an integrated signal, said amplitude of said integrated signal being proportional to said phase difference between said first electrical condition and said second electrical condition.

19. In an alternating current electrical transmission system having a pair of lines connected to a circuit breaker, a synchronizing check relay as defined in claim 18, wherein said active filter produces a triangular wave integrated signal when said first electrical condition has a first constant frequency and said second electrical condition has a second constant frequency not equal to said first constant frequency.

20. In an alternating current electrical transmission system having a pair of lines connected to a circuit breaker, a synchronizing check relay as defined in claim 19, wherein said phase sensor includes a phase angle comparator connected to said active filter to receive said integrated signal, said phase angle comparator also being connected to said timer, said phase angle comparator producing a phase angle reference potential, said phase angle comparator producing said selected phase sensor output when said integrated signal has a potential less than said phase angle reference potential.

21. In an alternating current electrical transmission system having a pair of lines connected to a circuit breaker, a synchronizing check relay comprising: input means adapted for connection to said pair of lines connected to said circuit breaker, said input means being adapted to detect a first electrical condition on one of said lines and a second electrical condition on another of said lines; a phase sensor connected to said input means, said phase sensor producing a selected phase sensor output when a difference between a phase of said first electrical condition and a phase of said second electrical condition is at a preselected condition; a timer connected to said phase sensor, said timer receiving said selected phase sensor output, said timer producing a time signal a selected time interval after receiving said selected phase sensor output, said time interval being independent of said selected condition of said difference between said phases; and an output control circuit, said output control circuit being connected to said timer, said output control circuit also connected to the circuit breaker, said output control circuit providing a control signal to said circuit breaker when said timer produces said time signal, said timer including a transistor having a base, an emitter and a collector, said base of said transistor being connected to said phase sensor to receive said selected phase sensor output, said collector of said transistor being connected to ground, a capacitor connected to ground, said capacitor being connected to said emitter of said transistor, a potential source connected to said capacitor, an operational amplifier connected to said capacitor, a potentiometer connected to said operational amplifier, said potential source being connected to said potentiometer, said potentiometer producing a preselected timer reference potential, said operational amplifier being connected to said output control circuit, said transistor being ON in the absence of said selected phase sensor output, said transistor being OFF when said phase sensor produces said selected phase sensor output, said capacitor being held at ground when said transistor is ON, said capacitor charging to a selected potential when said transistor is OFF, said capacitor taking said selected time interval to reach said preselected timer reference potential, said operational amplifier producing said time signal when said capacitor reaches said preselected timer reference potential.

22. In an alternating current electrical transmission system having a pair of lines connected to a circuit breaker, a synchronizing check relay comprising: input means adapted for connection to said pair of lines connected to said circuit breaker, said input means being adapted to detect a first electrical condition on one of said lines and a second electrical condition on another of said lines; a phase sensor connected to said input means, said phase sensor producing a selected phase sensor output when a difference between a phase of said first electrical condition and a phase of said second electrical condition is at a preselected condition; a timer connected to said phase sensor, said timer receiving said selected phase sensor output, said timer producing a time signal a selected time interval after receiving said selected phase sensor output, said time interval being independent of said selected condition of said difference between said phases; an output control circuit, said output control circuit being connected to said timer, said output control circuit also connected to the circuit breaker, said output control circuit providing a control signal to said circuit breaker when said timer produces said time signal, said output control circuit including an AND gate connected to said phase sensor and connected to said timer, a Zener diode connected to said AND gate, said AND gate switching high when said selected phase sensor output and said time signal are produced, said high output from said AND gate avalanching said Zener diode, a first transistor connected to said Zener diode, a source of potential connected to said first transistor, said first transistor switching ON when said Zener diode avalanches, a second transistor connected to said first transistor, said second transistor switching ON when said first transistor switches ON, and a mechanical relay connected to said second transistor, said mechanical relay being connected to said circuit breaker, said mechanical relay closing when said second transistor switches ON, said closure of said mechanical relay supplying a breaker closing signal to said circuit breaker.

23. In an alternating current electrical transmission system having a pair of lines connected to a circuit breaker, a synchronizing check relay comprising: input means adapted for connection to said pair of lines connected to said circuit breaker, said input means being adapted to detect a first electrical condition on one of said lines and a second electrical condition on another of said lines; a phase sensor connected to said input means, said phase sensor producing a selected phase sensor output when a difference between a phase of said first electrical condition and a phase of said second electrical condition is at a preselected condition; a timer connected to said phase sensor, said timer receiving said selected phase sensor output, said timer producing a time signal a selected time interval after receiving said selected phase sensor output, said time interval being independent of said selected condition of said difference between said phases; an output control circuit, said output control circuit being connected to said timer, said output control circuit also connected to the circuit breaker, said output control circuit providing a control signal to said circuit breaker when said timer produces said time signal; a power supply connected to said input means, said power supply having a first integrated circuit voltage regulator, a second integrated circuit voltage regulator is connected to the first integrated circuit voltage regulator, said second integrated circuit voltage regulator producing a highly stable direct current potential for other portions of the synchronizing check relay, said power supply including a first full wave rectifier bridge connected to said input means and a second full wave rectifier bridge connected to said input means, said first and second full wave rectifier bridges being connected to said first integrated circuit voltage regulator, said first full wave rectifier bridge being adapted to be supplied from said first electrical condition, said second full wave rectifier bridge being adapted to be supplied from said second electrical condition; and a voltage lockout circuit connected to each of said full wave rectifier bridges, said voltage lockout circuit also being connected to said phase sensor, said voltage lockout circuit providing a relatively high voltage to said phase sensor when either a potential of said first electrical condition or a potential of said second electrical condition is less than a preselected potential, said relatively high voltage supplied to said phase sensor preventing said phase sensor from generating said selected phase sensor output, said voltage lockout circuit includes a first NAND gate connected to said first full wave rectifier bridge to receive a first rectified potential to the potential of said first electrical condition, and a second NAND gate connected to said second full wave rectifier bridge to receive a second rectified potential proportional to the potential of said second electrical condition, each of said NAND gates being connected to said phase sensor, each of said NAND gates producing a high voltage when the rectified potential of the full wave rectifier bridge to which it is connected is less than said preselected potential.

24. In an alternating current electrical transmission system having a pair of lines connected to a circuit breaker, a synchronizing check relay comprising: input means adapted for connection to said pair of lines connected to said circuit breaker, said input means being adapted to detect a first electrical condition on one of said lines and a second electrical condition on another of said lines; a phase sensor connected to said input means, said phase sensor producing a selected phase sensor output when a difference between a phase of said first electrical condition and a phase of said second electrical condition is at a selected phase condition; a voltage sensor connected to said input means, said voltage sensor producing a selected voltage sensor output when a voltage of one of said electrical conditions is at a selected voltage condition, said selected voltage condition being independent of said selected phase condition; and an output control circuit, said output control circuit being connected to said phase sensor and said voltage sensor, said output control circuit also being connected to said circuit breaker, said output control circuit providing a control signal to said circuit breaker when said output control circuit receives said phase sensor signal and said voltage sensor signal, said voltage sensor including an upper voltage comparator, said upper voltage comparator producing an upper voltage response when either of said electrical conditions is at a selected upper voltage condition, said selected upper voltage condition being independent of said selected phase condition.

25. In an alternating current electrical transmission system having a pair of lines connected to a circuit breaker, a synchronizing check relay comprising: input means adapted for connection to said pair of lines connected to said circuit breaker, said input means being adapted to detect a first electrical condition on one of said lines and a second electrical condition on another of said lines; a phase sensor connected to said input means, said phase sensor producing a selected phase sensor output when a difference between a phase of said first electrical condition and a phase of said second electrical condition is at a selected phase condition; a voltage sensor connected to said input means, said voltage sensor producing a selected voltage sensor output when a voltage of one of said electrical conditions is at a selected voltage condition, said selected voltage condition being independent of said selected phase condition; and an output control circuit, said output control circuit being connected to said phase sensor and said voltage sensor, said output control circuit also being connected to said circuit breaker, said output control circuit providing a control signal to said circuit breaker when said output control circuit receives said phase sensor signal and said voltage sensor signal, said voltage sensor including a lower voltage comparator, said lower voltage comparator producing a lower voltage response when either of said electrical conditions is at a selected lower voltage condition, said selected lower voltage condition being independent of said selected phase sensor condition.

26. In an alternating current electrical transmission system having a pair of lines connected to a circuit breaker, a synchronizing check relay comprising: input means adapted for connection to said pair of lines connected to said circuit breaker, said input means being adapted to detect a first electrical condition on one of said lines and a second electrical condition on another of said lines; a phase sensor connected to said input means, said phase sensor producing a selected phase sensor output when a difference between a phase of said first electrical condition and a phase of said second electrical condition is at a selected phase condition; a voltage sensor connected to said input means, said voltage sensor producing a selected voltage sensor output when a voltage of one of said electrical conditions is at a selected voltage condition, said selected voltage condition being independent of said selected phase condition; and an output control circuit, said output control circuit being connected to said phase sensor and said voltage sensor, said output control circuit also being connected to said circuit breaker, said output control circuit providing a control signal to said circuit breaker when said output control circuit receives said phase sensor signal and said voltage sensor signal, said voltage sensor including an absolute value sensor, said absolute value sensor producing a selected absolute value sensor response when a difference between a potential of said first electrical condition and a potential of said second electrical condition is at a selected absolute value sensor condition, said selected absolute value sensor condition being independent of said selected phase condition.

27. In an alternating current electrical transmission system having a pair of lines connected to a circuit breaker, a synchronizing check relay comprising: input means adapted for connection to said pair of lines connected to said circuit breaker, said input means being adapted to detect a first electrical condition on one of said lines and a second electrical condition on another of said lines; a phase sensor connected to said input means, said phase sensor producing a selected phase sensor output when a difference between a phase of said first electrical condition and a phase of said second electrical condition is at a selected phase condition, said selected phase condition being substantially independent of temperature over a range of temperatures; timing means responsive to said selected phase sensor output for generating a time-out signal after a predetermined time interval, a voltage sensor connected to said input means, said voltage sensor producing a selected voltage sensor output when a potential of one of said electrical conditions is at a selected voltage condition, said voltage sensor condition being substantially independent of temperature; and an output control circuit, said output control circuit being connected to said voltage sensor, said output control circuit also being connected to the circuit breaker, said output control circuit providing a control signal to said circuit breaker when said phase sensor produces said selected phase sensor output and said timing means produces said time-out signal, said voltage sensor including an upper voltage comparator, said upper voltage comparator producing an upper voltage comparator response at a selected upper voltage condition, said selected upper voltage condition being substantially independent of temperature over a range of $-40°$ C. to $+80°$ C.

28. In an alternating current electrical transmission system having a pair of lines connected to a circuit breaker, a synchronizing check relay comprising: input means adapted for connection to said pair of lines connected to said circuit breaker, said input means being adapted to detect a first electrical condition on one of said lines and a second electrical condition on another of said lines; a phase sensor connected to said input means, said phase sensor producing a selected phase sensor output when a difference between a phase of said first electrical condition and a phase of said second electrical condition is at a selected phase condition, said selected phase condition being substantially independent of temperature over a range of temperatures; timing means responsive to said selected phase sensor output for generating a time-out signal after a predetermined time interval, a voltage sensor connected to said input means, said voltage sensor producing a selected voltage sensor output when a potential of one of said electrical conditions is at a selected voltage condition, said voltage sensor condition being substantially independent of temperature; and an output control circuit, said output control circuit being connected to said voltage sensor, said output control circuit being connected to the circuit breaker, said output control circuit providing a control signal to said circuit breaker when said phase sensor produces said selected phase sensor output and said timing means produces said time-out signal, said voltage sensor including a lower voltage comparator, said lower voltage comparator producing a lower voltage comparator response at a selected lower voltage condition, said selected lower voltage condition being substantially independent of temperature over a range of $-40°$ C. to $+80°$ C.

29. In an alternating current electrical transmission system having a pair of lines connected to a circuit breaker, a synchronizing check relay comprising: input means adapted for connection to said pair of lines connected to said circuit breaker, said input means being adapted to detect a first electrical condition on one of said lines and a second electrical condition on another of said lines; a phase sensor connected to said input means, said phase sensor producing a selected phase sensor output when a difference between a phase of said first electrical condition and a phase of said second electrical condition is at a selected phase condition, said selected phase condition being substantially independent of temperature over a range of temperatures; timing means responsive to said selected phase sensor output for generating a timeout signal after a predetermined time interval, a voltage sensor connected to said input means, said voltage sensor producing a selected voltage sensor output when a potential of one of said electrical conditions is at a selected voltage condition, said voltage sensor condition being substantially independent of temperature; and an output control circuit, said output control circuit being connected to said voltage sensor, said output control circuit also being connected to the circuit breaker, said output control circuit providing a control signal to said circuit breaker when said phase sensor produces said selected phase sensor output and said timing means produces said time-out signal, said voltage sensor including an absolute value sensor, said absolute value sensor producing an absolute value sensor response when a difference between a potential of said first electrical condition and a potential of said second electrical condition exceeds a selected absolute value condition, said selected absolute value condition being substantially independent of temperature over a range of −40° C. to +80° C.

30. In an alternating current electrical transmission system having a pair of lines connected to a circuit breaker, a synchronizing check relay comprising: input means adapted for connection to said pair of lines connected to said circuit breaker, said input means being adapted to detect a first electrical condition on one of said lines and a second electrical condition on another of said lines; a phase sensor connected to said input means, said phase sensor producing a selected phase sensor output when a difference between a phase of said first electrical condition and a phase of said second electrical condition is at a selected phase condition; a voltage sensor connected to said input means, said voltage sensor producing a selected voltage sensor output when a potential of one of said electrical conditions is at a selected voltage condition; a timer connected to said phase sensor, said timer receiving said phase sensor output, said timer producing a time signal a selected interval after receiving said phase sensor output, said time interval being independent of said selected phase sensor condition and said selected voltage sensor condition; and an output control circuit, said output control circuit being connected to said timer, said output control circuit being connected to said voltage sensor, said output control circuit also being connected to the circuit breaker, said output control circuit providing a control signal to said circuit breaker when said timer produces said time signal and said voltage sensor produces said voltage sensor output, said voltage sensor including an upper voltage comparator, said upper voltage comparator producing a selected upper voltage response when either a potential of either of said electrical conditions exceeds a selected upper voltage condition, said selected upper voltage condition being independent of said selected time interval.

31. In an alternating current electrical transmission system having a pair of lines connected to a circuit breaker, a synchronizing check relay comprising: input means adapted for connection to said pair of lines connected to said circuit breaker, said input means being adapted to detect a first electrical condition on one of said lines and a second electrical condition on another of said lines; a phase sensor connected to said input means, said phase sensor producing a selected phase sensor output when a difference between a phase of said first electrical condition and a phase of said second electrical condition is at a selected phase condition; a voltage sensor connected to said input means, said voltage sensor producing a selected voltage sensor output when a potential of one of said electrical conditions is at a selected voltage condition; a timer connected to said phase sensor, said timer receiving said phase sensor output, said timer producing a time signal a selected interval after receiving said phase sensor output, said time interval being independent of said selected phase sensor condition and said selected voltage sensor condition; and an output control circuit, said output control circuit being connected to said timer, said output control circuit being connected to said voltage sensor, said output control circuit also being connected to the circuit breaker, said output control circuit providing a control signal to said circuit breaker when said timer produces said time signal and said voltage sensor produces said voltage sensor output, said voltage sensor including a lower voltage comparator, said lower voltage comparator producing a selected lower voltage response when either a potential of either of said electrical conditions exceeds a selected lower voltage condition, said selected lower voltage condition being independent of said selected time interval.

32. In an alternating current electrical transmission system having a pair of lines connected to a circuit breaker, a synchronizing check relay comprising: input means adapted for connection to said pair of lines connected to said circuit breaker, said input means being adapted to detect a first electrical condition on one of said lines and a second electrical condition on another of said lines; a phase sensor connected to said input means, said phase sensor producing a selected phase sensor output when a difference between a phase of said first electrical condition and a phase of said second electrical condition is at a selected phase condition; a voltage sensor connected to said input means, said voltage sensor producing a selected voltage sensor output when a potential of one of said electrical conditions is at a selected voltage condition; a timer connected to said phase sensor, said timer receiving said phase sensor output, said timer producing a time signal a selected interval after receiving said phase sensor output, said time interval being independent of said selected phase sensor condition and said selected voltage sensor condition; and an output control circuit, said output control circuit being connected to said timer, said output control circuit being connected to said voltage sensor, said output control circuit also being connected to the circuit breaker, said output control circuit providing a control signal to said circuit breaker when said timer produces said time signal and said voltage sensor produces said voltage sensor output, said voltage sensor including an absolute value sensor, said absolute value sensor producing a selected absolute value sensor response when a difference between a potential of said first electrical condition and a potential of said second electrical condition is at a selected absolute value sensor conditions, said selected absolute value sensor condition being substantially independent of said selected time interval.

33. In an alternating current electrical transmission system having a pair of lines connected to a circuit breaker, a synchronizing check relay comprising: input means adapted for connection to said pair of lines connected to said circuit breaker, said input means by being adapted to detect a first electrical condition on one of said lines and a second electrical condition on another of said lines; a phase sensor connected to said input means; said phase sensor producing a selected phase sensor output when a difference between a phase of said first electrical condition and a phase of said second electrical condition is at a selected phase condition, a voltage sensor connected to said input means, said voltage sensor including an upper voltage comparator, said upper voltage comparator producing a selected upper voltage comparator output when said upper voltage comparator receives said potentials of said first and second electrical signals which exceed a selected upper voltage comparator condition; a lower voltage comparator, said lower voltage comparator producing a selected lower voltage comparator output when either of said electrical conditions is at a lower voltage condition; an absolute value sensor, said absolute value sensor producing a selected absolute value sensor response when a potential difference between said first electrical condition and said second electrical condition exceeds a selected absolute value sensor condition, said upper voltage comparator, said lower voltage comparator and said absolute value sensor operating independently of one another; output control circuitry, said upper voltage comparator providing the upper voltage comparator signal to said output control circuitry, said lower voltage comparator providing said lower voltage control signal to said output control circuitry, said absolute value sensor producing said absolute value signal to said output control circuitry, said output control circuitry providing a control signal to said circuit breaker when said phase sensor produces said selected phase sensor output and one of said upper voltage comparator, lower voltage comparator or absolute value sensor outputs is present.

34. In an alternating current electrical transmission system having a pair of first and second lines transmitting from and second alternating currents respectively and connected to a circuit breaker, and a synchronizing check relay connected to said lines and said circuit breaker, an absolute value difference amplifier comprising: a first operational amplifier adapted to receive a direct current from said synchronizing check relay proportional to a potential of a first alternating current from said first line, said first operational amplifier inverting said first direct current potential, a second operational amplifier connected to receive a second direct current potential from said synchronizing check relay proportional to an alternating current on said second line, said second operational amplifier having a diode connected between an inverting terminal and an output terminal, said second operational amplifier being a unity gain inverting amplifier, said second operational amplifier also being connected to receive input from said first operational amplifier, said second operational amplifier being active for selected portions of said first and second direct current potentials, and a third operational amplifier connected to said first and second operational amplifiers, said third operational amplifier providing amplification to a potential difference between an absolute value of said first direct current potential and said second direct current potential.

35. In an alternating current electrical transmission system having a pair of lines connected to a circuit breaker and a synchronizing check relay connected to said lines and said circuit breaker, an absolute value difference amplifier as defined in claim 34, wherein said second operational amplifier has an inverting terminal said second operational amplifier being connected to receive said first direct current potential at its inverting terminal, said third operational amplifier having a variable resistor connected between an inverting terminal of said third operational amplifier and an output terminal of said third operational amplifier, said third operational amplifier producing a signal proportional to an absolute difference between said first D.C. potential and said second D.C. potential, said output of said absolute value difference amplifier being provided to an output line connected to other portions of said circuitry.

36. In an alternating current electrical transmission system having a pair of lines connected to a circuit breaker, a synchronizing check relay comprising: first and second input circuits adapted for connection to said lines adjacent to said circuit breaker to receive first and second alternating currents; an integrated circuit regulated power supply connected to said first and second input circuits for providing a plurality of regulated direct current low voltage potentials to other portions of the synchronizing check relay; a first alternating current to direct current converter connected to said first input circuit to receive said first alternating current potential, said first alternating current to direct current converter producing a first direct current potential directly proportional to said first alternating current potential; a second alternating current to direct current converter connected to said second input circuit, said second alternating current to direct current converter producing a second direct current potential proportional to said second alternating current potential; a lower voltage comparator connected to said first and second alternating current to direct current converters for receiving an adjustable lower voltage reference potential and for receiving one of said direct current potentials to in turn produce a lower voltage breaker closing inhibit signal when said voltage from said first alternating current to direct current converter or from said second alternating current to direct current converter is below said lower voltage reference potential; an upper voltage comparator connected to said first and second alternating current to direct current converters for receiving an adjustable upper voltage reference potential and for receiving one of said direct current potentials from said alternating current to direct current converters to in turn produce a respective upper voltage breaker closing inhibit signal when said first direct current potential or said second current potential exceeds said adjustable upper voltage reference potential; an absolute value difference amplifier connected to said first and second alternating current to direct current converters for effective operation within said absolute value difference amplifier only when said first direct current potential exceeds said second direct current potential and for producing an absolute value potential proportional to a difference between a value of said first direct current potential and said second direct current potential; a voltage difference comparator connected to said absolute value difference amplifier for producing a voltage difference reference potential, said voltage difference comparator producing a voltage difference breaker closing inhibit signal when said absolute value potential exceeds said voltage difference reference potential; a dead bus comparator connected to said first alternating current to direct current converter for producing a dead bus reference potential and for producing a selected dead bus breaker closing override signal when said reference potential of said first direct current potential is less than said dead bus reference potential; a dead line comparator connected to said second alternating current to direct current converter for producing a dead line reference potential and for producing a dead line breaker closing override signal when said second direct current potential is less than said dead line reference potential; a voltage input logic section connected to said lower voltage comparator, said upper voltage comparator and said voltage difference comparator for producing a master breaker closing inhibit signal when it receives any breaker closing inhibit signal; a power relay logic circuit being selectively connectable to said dead bus comparator and said dead line comparator for producing a power relay control signal when said dead bus comparator or said dead line comparator provides the respective breaker override signal; a zero crossing detector connected to said first input circuit and said second input circuit, said zero crossing detector producing a rectangular wave having a high amplitude time duration substantially equal to a time of phase coincidence between said first alternating current potential and said second alternating current potential; an active filter integrating said rectangular wave to produce an integrated potential having an amplitude directly proportional to a phase difference between said first alternating current potential and said second alternating current potential; a scaling amplifier connected to said active filter for amplifying said integrated potential of said active filter, a phase angle comparator connected to said active filter, said phase angle comparator receiving said amplified integrated potential for producing a selected phase angle comparator output when said amplitude of said integrated potential signal exceeds a preselected phase voltage reference potential; a timer connected to said phase angle comparator and being held in an OFF state when said phase angle comparator is producing a high potential signal and being switched ON when said phase angle comparator produces a low potential signal, said timer producing a time signal a preselected time interval after said timer is switched ON, said timer signal and said selected phase angle comparator output causing said power relay circuit to produce said power relay control signal in the absence of said breaker closing override signal; and a power relay circuit connected to said power relay logic circuit for causing said circuit breaker to close when said power relay logic circuit produces said power relay control signal.

* * * * *